(12) United States Patent
On et al.

(10) Patent No.: US 8,199,227 B2
(45) Date of Patent: Jun. 12, 2012

(54) IMAGE-SIGNAL PROCESSING APPARATUS FOR PERFORMING SPACE-VARIANT IMAGE-SIGNAL PROCESSING

(75) Inventors: Seigo On, Hachioji (JP); Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 579 days.

(21) Appl. No.: 12/067,487

(22) PCT Filed: Sep. 28, 2006

(86) PCT No.: PCT/JP2006/319300
§ 371 (c)(1),
(2), (4) Date: Sep. 11, 2009

(87) PCT Pub. No.: WO2007/037327
PCT Pub. Date: Apr. 5, 2007

(65) Prior Publication Data
US 2010/0002104 A1    Jan. 7, 2010

(30) Foreign Application Priority Data

Sep. 28, 2005  (JP) ................................. 2005-283022

(51) Int. Cl.
*H04N 5/208* (2006.01)
(52) U.S. Cl. ......... 348/252; 348/254; 358/521; 382/169
(58) Field of Classification Search .................. 348/252, 348/254, 652, 671; 358/521, 451, 452, 448, 358/519, 534, 536; 382/169, 254, 274, 298, 382/299
See application file for complete search history.

(56) References Cited

U.S. PATENT DOCUMENTS

| | | | | |
|---|---|---|---|---|
| 5,289,295 | A * | 2/1994 | Yumiba et al. ................ | 358/518 |
| 6,947,078 | B1 * | 9/2005 | Kuwata et al. ............ | 348/223.1 |
| 7,359,571 | B2 * | 4/2008 | Terashita ...................... | 382/274 |
| 7,443,453 | B2 * | 10/2008 | Hsu et al. ...................... | 348/645 |
| 7,535,503 | B2 * | 5/2009 | Hoshuyama ................... | 348/252 |
| 2002/0094131 | A1 * | 7/2002 | Shirakawa .................... | 382/274 |
| 2004/0174444 | A1 * | 9/2004 | Ishii .......................... | 348/240.1 |
| 2004/0189818 | A1 * | 9/2004 | Tsuruoka et al. .......... | 348/221.1 |
| 2006/0114527 | A1 * | 6/2006 | Tsukioka et al. ............. | 358/519 |
| 2008/0273812 | A1 * | 11/2008 | Fujita et al. .................. | 382/274 |

FOREIGN PATENT DOCUMENTS

| | | |
|---|---|---|
| JP | 6-103208 | 4/1994 |
| JP | 10-283470 | 10/1998 |
| JP | 11-308444 | 11/1999 |
| JP | 2001-118062 | 4/2001 |
| JP | 2002-300412 | 10/2002 |
| JP | 2003-069821 | 3/2003 |
| JP | 2003-162715 | 6/2003 |
| JP | 2003-204932 | 7/2003 |
| JP | 2003-244620 | 8/2003 |
| JP | 2004-214771 | 7/2004 |
| JP | 2005-130297 | 5/2005 |

* cited by examiner

*Primary Examiner* — Tuan Ho
*Assistant Examiner* — Kent Wang
(74) *Attorney, Agent, or Firm* — Volpe and Koenig, P.C.

(57) ABSTRACT

The object is to enable picture compositing having a balanced and uniform appearance over the whole image even when performing space-variant image-signal processing. Provided is an image-signal processing apparatus for performing image-signal processing on an input image signal, the image-signal processing apparatus comprising a first signal processing unit for performing first signal processing on the input image signal; a correction-coefficient calculating unit for calculating a first correction coefficient on the basis of the image signal after being subjected to the first signal processing by the first signal processing unit; and a second signal processing unit for performing second signal processing on the input image signal using the first correction coefficient.

28 Claims, 24 Drawing Sheets

IMAGE-SIGNAL PROCESSING APPARATUS FOR PERFORMING SPACE-VARIANT IMAGE-SIGNAL PROCESSING

TECHNICAL FIELD

The present invention relates to an image-signal processing apparatus for performing space-variant image-signal processing and, more particularly, relates to an image-signal processing apparatus and an image-signal processing program in which processing results of uniform appearance are obtained in picture compositing.

BACKGROUND ART

Conventionally, in digital still cameras, video cameras, and so forth, in order to prevent image degradation due to cancellation of digits in digital signal processing, the grayscale range of the signal at the input and processing stages (around 10 to 12 bits) is set to be larger than the grayscale range of the final output signal (normally 8 bits). In this case, it is necessary to perform grayscale conversion so as to match the grayscale range of the output system. Conventionally, grayscale conversion is performed with static grayscale characteristics for a reference scene. In addition, a method has also been proposed in which the grayscale characteristics are obtained for an acquired scene, and the grayscale is converted adaptively.

For example, Japanese Unexamined Patent Application, Publication No. 2003-69821 (Patent Document 1) discloses a technique for performing grayscale conversion in which importance is placed on the main subject by estimating the image acquisition conditions. Patent Document 1 also discloses a technique for suppressing the adverse effects of noise and so forth by imposing limits on the obtained grayscale characteristics.

On the other hand, a method of performing grayscale conversion by independently changing the grayscale conversion characteristics for each region in an image signal (space-variant) has also been proposed. For example, Publication of Japanese Patent No. 3465226 discloses a technique for dividing a video signal into regions on the basis of texture information and performing adaptive grayscale conversion for each region (in other words, a technique for performing space-variant grayscale conversion).

Patent Document 1:
Japanese Unexamined Patent Application, Publication No. 2003-69821

Patent Document 2:
Publication of Japanese Patent No. 3465226

DISCLOSURE OF INVENTION

However, with the conventional static grayscale characteristics, there is a problem in that a suitable image signal cannot be obtained under non-standard conditions, such as with backlighting.

In addition, with the method disclosed in Patent Document 1, there is a problem in that it is not possible to obtain adequate improvement for a scene with a large contrast ratio because grayscale conversion is performed on a single video signal using a single grayscale characteristic.

In contrast, the method disclosed in Patent Document 2 has an advantage in that adequate improvement can be obtained even for a scene with a large contrast ratio because grayscale conversion is performed using independent grayscale characteristics for each region. However, in the invention described in Patent Document 2, there is a problem in that different picture compositing processing is performed in each region because the picture compositing processing, such as saturation enhancement and edge enhancement, is not subjected to uniform control, and therefore, the overall image does not have a balanced or uniform appearance.

The present invention has been conceived in light of the problems described above, and an object thereof is to provide an image-signal processing apparatus and an image-signal processing program that are capable of picture compositing with a balanced and uniform appearance over the entire image when performing space-variant image-signal processing.

A first aspect of the present invention is an image-signal processing apparatus for performing image signal processing on an input image signal, the image-signal processing apparatus comprising: a first signal processing unit for performing first signal processing on the input image signal from the image-acquisition device; a correction-coefficient calculating unit for calculating a first correction coefficient on the basis of the input image signal subjected to the first signal processing by the first signal processing unit; and a second signal processing unit for performing second signal processing on the input image signal using the first correction coefficient.

With this configuration, in the first signal processing unit, for example, space-variant prescribed signal processing is performed on the input image signal, for example, the image signal from the image-acquisition device, and first correction coefficient is calculated in the correction-coefficient calculating unit on the basis of this signal-processed image signal. Then, in the second signal processing unit, the image signal from the image-acquisition device is subjected to signal processing using the first correction coefficient, for example, space-variant signal processing.

Accordingly, by performing image processing again by using the first correction coefficients calculated on the basis of the image-processed image signal, it is possible to reduce saturation enhancement failure, edge enhancement failure, and so forth.

The following is a description of the above configuration, specifically associated with embodiments to be described later. Specifically, the embodiments corresponding to this configuration are the first and second embodiments. A signal-processing unit 104 corresponds to the first signal processing unit and the second signal processing unit in this configuration, and a correction-coefficient calculating unit 109 corresponds to the correction-coefficient calculating unit.

A second aspect of the present invention is an image-signal processing apparatus for performing image-signal processing on an input image signal, the image signal processing apparatus comprising a reduction unit for performing reduction processing on the input image signal to generate a reduced image signal; a first signal processing unit for performing first signal processing on the reduced image signal; a correction-coefficient calculating unit for calculating a first correction coefficient on the basis of the input image signal subjected to the first signal processing by the first signal processing unit; and a second signal processing unit for performing second signal processing on the input image signal using the first correction coefficient.

With this configuration, in the reduction unit, the reduced image signal is generated by performing reduction processing on the image signal from the image-acquisition device. Then, in the first signal processing unit, for example, space-variant prescribed signal processing is performed on the reduced image signal, and the first correction coefficient is calculated in the correction-coefficient calculating unit on the basis of this signal-processed image signal. Then, in the second signal processing unit, the image signal from the image-acquisition device is subjected to signal processing using the first correction coefficient, for example, space-variant signal processing.

Accordingly, by performing image processing again by using the first correction coefficient calculated on the basis of the image-processed image signal, it is possible to obtain a uniform, high-quality image signal, and it is possible to reduce adverse effects such as saturation enhancement failure and edge enhancement failure. In addition, by determining the first correction coefficient on the basis of the reduced image signal, it is possible to shorten the processing time.

The following is a description of the above configuration, specifically associated with embodiments to be described later. Specifically, the embodiments corresponding to this configuration are the first and second embodiments. An image-signal reduction unit 110 shown in FIG. 1 corresponds to the reduction unit in this configuration, a signal-processing unit 104 corresponds to the first signal processing unit and the second signal processing unit, and a correction-coefficient calculating unit 109 corresponds to the correction-coefficient calculating unit.

An example of a preferred application of this configuration is an image-signal processing apparatus such as the one shown below.

That is, as shown in FIG. 1, the image signal from the image-acquisition device is transferred from the buffer unit 103 to the image-signal reduction unit 110, and reduction processing is performed on the image signal in the image-signal reduction unit 110. Then, in the signal processing unit 104, signal processing is performed on this reduced image signal, and in the correction-coefficient calculating unit 109, the first correction coefficients are calculated on the basis of the signal-processed reduced image signal. The first correction coefficients are then stored in the RAM 108. Next, the image signal from the image-acquisition device is transferred again from the buffer unit 103 to the signal processing unit 104, and signal processing is performed in the signal processing unit 104 by using the first correction coefficients stored in the RAM 108.

The image-signal processing apparatus described above preferably further comprises a reduction-ratio setting unit for setting a reduction ratio.

By providing the reduction-ratio setting unit in this way, it is possible to set any reduction ratio. Accordingly, it is possible to adjust the precision and processing speed, thus allowing improved freedom of processing.

The following is a description of the above configuration, specifically associated with embodiments to be described later. Specifically, the embodiments corresponding to this configuration are the first and second embodiments. For example, the external interface unit 107 and the ROM 111 shown in FIG. 1 correspond to the reduction-ratio setting unit of this configuration.

An example of a preferred application of this configuration is, as shown in FIG. 1, an image-signal processing apparatus in which, in the buffer unit 103, the image signal from the image-acquisition device is transferred to the image-signal reduction unit 110, the user specifies one of a plurality of image reduction ratios stored in the ROM 111 by using the external interface unit 107, and image-signal reduction processing is performed in the image-signal reduction unit 110 on the basis of the specified reduction ratio.

In the image-signal processing apparatus described above, preferably, the first signal processing unit extracts a pixel or a region of prescribed size from the image signal to be processed, calculates a second correction coefficient for the extracted pixel or region, and performs the first signal processing using the second correction coefficient.

With this configuration, by calculating the second correction coefficients for the extracted pixel or region and performing the first signal processing by using these second correction coefficients, it is possible to improve the image quality when, for example, processing in pixel units, and in addition, it is possible to speed up the processing when processing in region units.

The following is a description of the above configuration, specifically associated with embodiments to be described later. Specifically, the embodiments corresponding to this configuration are the first and second embodiments. For example, the second correction coefficients are calculated by the second-correction-coefficient calculating unit 210 shown in FIG. 2.

An example of a preferred application of this configuration is, as shown in FIG. 2, an image-signal processing apparatus in which the image signal from the WB unit 201 is transferred to the second-correction-coefficient calculating unit 210, and the second correction coefficients are calculated in the second-correction-coefficient calculating unit 210 for each pixel or each region.

In the image-signal processing apparatus described above, preferably, the first signal processing unit includes at least one of a saturation enhancement unit for performing saturation-enhancement using the second correction coefficient; an edge enhancement unit for performing edge enhancement using the second correction coefficient; and a grayscale conversion unit for performing grayscale conversion using the second correction coefficient.

With this configuration, at least one of space-variant saturation enhancement, edge enhancement, and grayscale conversion is performed on the image signal from the image-acquisition device or the reduced image signal by using the second correction coefficients calculated from the image signal from the image-acquisition device or the reduced image signal. In particular, when performing space-variant image-signal processing on the reduced image signal by using the second correction coefficients calculated from the reduced image signal, it is possible to further increase the processing speed.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the saturation enhancement unit in this configuration. The edge enhancement unit 208 shown in FIG. 2, for example, corresponds to the edge enhancement unit. The grayscale conversion unit 204 and the grayscale conversion unit 206 shown in FIG. 2, for example, correspond to the grayscale conversion unit.

An example of a preferred application of this configuration is the image-signal processing apparatus shown below.

For example, as shown in FIG. 2, the image signal transferred to the signal processing unit 104 is subjected to white-balance correction in the WB unit 201 and is separated into a low-frequency component and a high-frequency component, and the low-frequency component is subjected to color interpolation in the interpolation processor 202, saturation enhancement in the saturation enhancement unit 203, and grayscale conversion in the grayscale conversion unit 204. Then, in the Y/C separator 205, separation processing is performed into a luminance signal and a color-difference signal, the high-frequency component is subjected to grayscale conversion in the grayscale conversion unit 206, and edge components are extracted in the edge extraction unit 207. Then, in the edge enhancement unit 208, edge enhancement is performed on the basis of the luminance signal from the Y/C separator 205 and the edge components from the edge extraction unit 207 (at least one of the above-described saturation enhancement, edge enhancement, and grayscale conversion is performed by using the second correction coefficients), and the luminance signal and the color-difference signal from the edge enhancement unit 208 are color converted to an RGB signal in the color-conversion unit 209.

In the image-signal processing apparatus described above, preferably, the first signal processing unit includes at least one of a saturation enhancement unit for performing saturation enhancement using a fixed correction coefficient, an edge enhancement unit for performing edge enhancement using the fixed correction coefficient, and a grayscale conversion unit for performing grayscale conversion using the fixed correction coefficient.

With this configuration, because picture compositing of the image signal is performed on the basis of the specified fixed correction coefficients for at least one of saturation enhancement, edge enhancement, and grayscale conversion, it is possible to increase the processing speed.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the saturation enhancement unit in this configuration. The edge enhancement unit 208 shown in FIG. 2, for example, corresponds to the edge enhancement unit. The grayscale conversion unit 204 and the grayscale conversion unit 206 shown in FIG. 2 correspond to the grayscale conversion unit.

An example of a preferred application of this configuration is an image-signal processing apparatus such as that described below.

For example, as shown in FIG. 2, the image signal transferred to the signal processing unit 104 is subjected to white-balance correction in the WB unit 201, the image signal is divided into a low-frequency component and a high-frequency component, and color interpolation is performed on the low-frequency component in the interpolation processor 202. Then, the fixed correction coefficient is extracted from the ROM 111, saturation enhancement is performed in the saturation enhancement unit 203, grayscale conversion is performed in the grayscale conversion unit 204, and separation processing into a luminance signal and a color-difference signal is performed in the Y/C separator 205. Then, grayscale conversion is performed on the high-frequency component in the grayscale conversion unit 206, edge components are extracted in the edge extraction unit 207, and edge enhancement is performed in the edge enhancement unit 208 on the basis of the luminance signal from the Y/C separator 205 and the edge components from the edge extraction unit 207 (in at least one of the above-described saturation enhancement, edge extraction, and grayscale conversion, processing is performed using the fixed correction coefficient). Then, in the color-conversion unit 209, the luminance signal and the color-difference signal from the edge enhancement unit 208 are color converted to RGB signals.

In the image-signal processing apparatus described above, preferably, the correction-coefficient calculating unit extracts a pixel or a region of prescribed size from the image signal generated by the first signal processing unit and calculates the first correction coefficient for the extracted pixel or region.

With this configuration, first correction coefficients are independently calculated for the image signal for the extracted pixel or region.

Accordingly, because the first correction coefficients are calculated for each pixel or each region from the image signal after it is subjected to signal processing by the first signal processing unit and picture compositing is performed again using these first correction coefficients, it is possible to obtain a uniform, high-quality image signal.

The following is a description of the above configuration, specifically associated with embodiments to be described later. Specifically, the embodiments corresponding to this configuration are the first and second embodiments. For example, the first correction coefficients are calculated by the correction-coefficient calculating unit 109 shown in FIG. 1.

An example of a preferred application of this configuration is, a shown in FIG. 1, an image-signal processing apparatus in which the processed image signal from the signal processing unit 104 is transferred to the correction-coefficient calculating unit 109, and in the correction-coefficient calculating unit 109, the image signal is extracted for each pixel or each region and the first correction coefficients are calculated for the extracted image signal.

In the image-signal processing apparatus described above, preferably, the correction-coefficient calculating unit includes a coefficient-interpolating unit which obtains the first correction coefficient corresponding to the reduced image signal from the image signal after the first signal processing performed on the reduced image signal and calculates the first correction coefficient for the input image signal by performing interpolation on the first correction coefficient corresponding to the reduced image signal.

With this configuration, because interpolation is performed on the first correction coefficients corresponding to the reduced image signal, it is possible to obtain the first correction coefficients in a shorter time compared to a case where the first correction coefficients are obtained directly on the basis of the image signal from the image-acquisition device. Accordingly, it is possible to reduce the processing time.

The following is a description of the above configuration, specifically associated with embodiments to be described later. Specifically, the embodiments corresponding to this configuration are the first and second embodiments. The correction-coefficient interpolation unit 403 shown in FIG. 10, for example, corresponds to the coefficient interpolating unit of this configuration.

An example of a preferred application of this configuration is, as shown in FIG. 1, an image-signal processing apparatus in which, under the control of the control unit 106, the correction-coefficient interpolation unit 403 reads out the first correction coefficients calculated by the first-correction-coefficient calculating unit 401, which are stored in the buffer unit 402, and interpolates these first correction coefficients on the basis of the size of the image signal from the image-acquisition device, which is stored in the RAM 108, to calculate the first correction coefficients corresponding to each pixel of the image signal from the image-acquisition device.

In the image-signal processing apparatus described above, preferably, the second signal processing unit includes at least one of a saturation enhancement unit for performing saturation enhancement using the first correction coefficient, an edge enhancement unit for performing edge enhancement using the first correction coefficient, and a grayscale conversion unit for performing grayscale conversion using the first correction coefficient.

With this configuration, because picture compositing (at least one of saturation enhancement, edge enhancement, and grayscale conversion) is performed using the first correction coefficients, it is possible to reduce the sense of unnaturalness that conventionally occurs in each region in statically controlled picture compositing. Accordingly, it is possible to obtain a uniform, high-quality image signal.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the saturation enhancement unit in this configuration. The edge enhancement unit 208 shown in FIG. 2, for example, corresponds to the edge enhancement unit. The grayscale conversion unit 204 and the grayscale conversion unit 206 shown in FIG. 2, for example, correspond to the grayscale conversion unit.

An example of a preferred application of this configuration is an image-signal processing apparatus such as that described below.

Specifically, as shown in FIG. 2, the image signal transferred to the signal processing unit 104 is subjected to white-balance correction in the WB unit 201 and is split into a low-frequency component and a high-frequency component, and the first correction coefficients are extracted from the RAM 108. Then, color interpolation is performed on the low-frequency component in the interpolation processor 202, saturation enhancement is performed in the saturation enhancement unit 203, and grayscale conversion is performed in the grayscale conversion unit 204. Then, in the Y/C separator 205, division processing into a luminance signal and a color-difference signal is performed. On the other hand, grayscale conversion is performed on the high-frequency component in the grayscale conversion unit 206, edge components are extracted in the edge extraction unit 207, and edge enhancement is performed in the edge enhancement unit 208 using the luminance signal from the Y/C separator 205 and the edge components from the edge extraction unit 207 (in at least one of the saturation enhancement, edge enhancement, and grayscale conversion described above, processing is performed using the first correction coefficients). Then, in the color-conversion unit 209, the luminance signal and the color-difference signal from the edge enhancement unit 208 are color converted to an RGB signal.

In the image-signal processing apparatus described above, preferably, the edge enhancement unit includes an edge extraction unit for extracting an edge intensity from an image signal to be processed; a first control unit for controlling an enhancement gain for the edge intensity; a second control unit for controlling a coring gain for the edge intensity; and a third control unit for controlling a chroma-suppression gain for the edge intensity.

With this configuration, the enhancement gain for the edge intensity extracted by the edge extraction unit is controlled in the first control unit, and the coring gain for the edge intensity is controlled in the second control unit. Also, the chroma-suppression gain for the edge intensity is controlled in the third control unit. Then, respective edge-enhancements are performed by using these controlled (adjusted) edge intensities. Accordingly, it is possible to obtain a uniform image signal. The edge intensities are calculated on the basis of, for example, the first correction coefficients, the second correction coefficients, or the fixed correction coefficient.

The following is a description of the above configuration, specifically associated with embodiments to be described later. Specifically, the embodiments corresponding to this configuration are the first and second embodiments. The edge extraction unit 207 shown in FIG. 2, for example, corresponds to the edge extraction unit of this configuration. The edge-intensity control unit 301 shown in FIG. 6, for example, corresponds to the first control unit. The coring control unit 302 shown in FIG. 6, for example, corresponds to the second control unit. The chroma-suppression control unit 303 shown in FIG. 6, for example, corresponds to the third control unit.

An example of a preferred application of this configuration is, as shown in FIG. 6, an image-signal processing apparatus in which the edge intensity is extracted in the edge extraction unit 207 and is transferred to the edge-intensity control unit 301, the edge enhancement gain for the extracted edge intensity is calculated in the edge-intensity control unit 301, coring processing is performed in the coring control unit 302 on the basis of the edge intensity, chroma-suppression is performed in the chroma-suppression control unit 303 on the basis of the edge intensity from the coring unit 302, and edge addition is performed in the edge-adding unit 304.

In the image-signal processing apparatus described above, preferably, the saturation enhancement unit includes a color-signal conversion unit for performing matrix transformation in RGB signal space.

With this configuration, saturation enhancement is performed in RGB color space using matrix transformation. Because matrix calculations in RGB space can be executed at high speed, it is possible to reduce the processing time. Also, the smaller hardware means that cost reductions can be realized.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the color-signal conversion unit in this configuration.

An example of a preferred application of this configuration is an image-signal processing apparatus which performs saturation enhancement in the saturation enhancement unit 203.

In the image-signal processing apparatus described above, preferably, the saturation enhancement unit includes a color-signal conversion unit for performing table conversion in RGB signal space.

With this configuration, saturation enhancement is performed by carrying out table conversion in RGB color space. For example, the color-signal conversion unit extracts a color conversion table corresponding to the first correction coefficients, the second correction coefficients, or the fixed correction coefficient from a plurality of color conversion tables and performs saturation enhancement using the extracted color conversion table.

Because the color conversion table is used in this way, it is possible to perform high-speed processing. In addition, by intentionally eliminating calculations, it is possible to realize lower costs and better electrical energy efficiency.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the color-signal conversion unit of this configuration.

An example of a preferred application of this configuration is an image-signal processing apparatus which performs saturation enhancement in the saturation enhancement unit 203.

In the image-signal processing apparatus described above, preferably, the saturation enhancement unit includes a color-signal conversion unit for performing matrix transformation in L*a*b* signal space.

With this configuration, saturation enhancement is performed in L*a*b* signal space by matrix transformation. Performing saturation enhancement in perception color space in this way enables a high-quality image signal having preferred colors for human perception to be obtained.

The following is a description of the above configuration, specifically associated with embodiments to be described later. Specifically, the embodiments corresponding to this configuration are the first and second embodiments. The saturation enhancement unit 203 shown in FIG. 2, for example, corresponds to the color-signal conversion unit of this configuration.

An example of a preferred application of this configuration is an image-signal processing apparatus which converts an RGB signal to an L*a*b* signal and performs saturation enhancement in the saturation enhancement unit 203.

In the image-signal processing apparatus described above, preferably, the saturation enhancement unit includes a color-signal conversion unit for performing table conversion in L*a*b* signal space.

With this configuration, saturation enhancement is performed by carrying out table conversion in L*a*b* color space. For example, the color-signal conversion unit extracts a color conversion table corresponding to the first correction coefficients, the second correction coefficients, or the fixed correction coefficient from a plurality of color conversion tables and performs saturation enhancement using the extracted color conversion table.

Because saturation enhancement is performed in a perception color space in this way, it is possible to obtain a high-quality image signal having preferred colors for human perception. Also, by using the color conversion table, it is possible to perform high-speed processing. Moreover, intentionally eliminating calculations makes it possible to realize lower costs and improved electrical energy efficiency.

The following is a description of the above configuration, specifically associated with embodiments to be described later. The embodiments corresponding to this configuration are the first and second embodiments. The saturation enhancement unit 203 shown in FIG. 2, for example, corresponds to the color-signal conversion unit of this configuration.

An example of a preferred application of this configuration is an image-signal processing apparatus which converts an RGB signal to an L*a*b* signal and performs saturation enhancement in the saturation enhancement unit 203.

In the image-signal processing apparatus described above, preferably, the first control unit includes an enhancement-gain calculating unit for calculating an enhancement gain for the edge intensity; and an enhancement-gain correction unit for correcting the enhancement gain on the basis of the first correction coefficient.

With this configuration, the enhancement gain is calculated in the enhancement gain calculating unit on the basis of, for example, the luminance level corresponding to the target pixels and any one of the first correction coefficients, the second correction coefficients, and the fixed correction coefficient, and the enhancement gain is corrected in the enhancement-gain correction unit on the basis of the first correction coefficients.

Because the enhancement gain for edge correction corresponding to the target pixels and any one of the first correction coefficient, the second correction coefficients, and the fixed correction coefficient, and this enhancement gain is then corrected using the first correction coefficients, it is possible to perform edge enhancement suitable for obtaining the desired image.

The following is a description of the above configuration, specifically associated with embodiments to be described later. Specifically, the embodiments corresponding to this configuration are the first and second embodiments. The edge-intensity control unit 301 shown in FIG. 6, for example, corresponds to the enhancement-gain calculating unit and the enhancement-gain correction unit in this configuration.

An example of a preferred application of this configuration is an image-signal processing apparatus which calculates and corrects the edge enhancement gain for the extracted edge intensity in the edge-intensity control unit 301.

In the image-signal processing apparatus described above, preferably, the second control unit includes a coring-gain calculating unit for calculating the coring gain on the basis of the edge intensity; and a coring-gain correction unit for correcting the coring gain on the basis of the corrected enhancement gain.

With this configuration, for example, the coring gain is calculated in the coring-gain calculating unit, and the coring gain is corrected in the coring-gain calculating unit on the basis of the enhancement gain corrected in the enhancement-gain correction unit described above. By performing coring using the corrected coring gain in this way, it is possible to easily obtain desired image signals for multiple purposes.

The following is a description of the above configuration, specifically associated with embodiments to be described later. Specifically, the embodiments corresponding to this configuration are the first and second embodiments. The coring enhancement unit 302 shown in FIG. 6, for example, corresponds to the coring-gain calculating unit and the coring-gain correction unit in this configuration.

An example of a preferred application of this configuration is an image-signal processing apparatus which performs coring in the coring enhancement unit 302.

In the image-signal processing apparatus described above, preferably, the third control unit includes a chroma-suppression-gain calculating unit for calculating the chroma-suppression gain on the basis of the edge intensity; and a chroma-suppression-gain correction unit for correcting the chroma-suppression gain on the basis of the corrected coring gain.

With this configuration, because the chroma-suppression gain is calculated in the chroma-suppression-gain calculating unit on the basis of the edge intensity and is corrected in the chroma-suppression-gain correction unit, it is possible to easily obtain desired images for multiple purposes by performing chroma suppression using the corrected chroma-suppression gain.

The following is a description of the above configuration, specifically associated with embodiments to be described later. Specifically, the embodiments corresponding to this configuration are the first and second embodiments. The chroma-suppression control unit 303 shown in FIG. 6, for example, corresponds to the chroma-suppression-gain calculating unit and the chroma-suppression-gain correction unit of this configuration.

An example of a preferred application of this configuration is an image-signal processing apparatus which performs chroma suppression in the chroma-suppression control unit 303.

The image-signal processing apparatus described above preferably further comprises a scene-judging unit for judging whether or not the input image signal is an image signal obtained by acquiring a prescribed scene or a prescribed subject, wherein at least one of the first signal processing unit and the second signal processing unit changes the processing on the basis of the judgment result of the scene-judging unit.

According to this configuration, because the image signal processing performed by at least one of the first signal processing unit and the second signal processing unit is changed depending on whether or not the input image signal is obtained by acquiring a prescribed scene or a prescribed subject, it is possible to obtain a suitable image for the scene or subject.

For example, the corrected first correction coefficients are used in saturation enhancement, and the corrected second correction coefficients are used in grayscale conversion.

With an image-signal processing apparatus having a function for setting the scene mode, whether or not the conditions are satisfied may be judged by reading out a set scene mode. Also, a configuration which can make this judgment based on an autofocus setting etc. may also be used.

The following is a description of the above configuration, specifically associated with embodiments to be described later. Specifically, the embodiments corresponding to this configuration are the third to fifth embodiments. The scene-judging unit 700 shown in FIG. 18, for example, corresponds to the condition-setting unit in this configuration.

The image-signal processing apparatus described above preferably further comprises a correction coefficient adjusting unit for adjusting at least one of the first correction coefficient and the second correction coefficient on the basis of the judgment result of the scene-judging unit.

With this configuration, because at least one of the first correction coefficients and the second correction coefficients are corrected according to the scene and the degree of importance of the pixels to be processed, it is possible to realize picture compositing such as saturation enhancement and grayscale conversion using the optimum correction coefficients for each scene. Accordingly, it is possible to obtain superior image quality.

The following is a description of the above configuration, specifically associated with embodiments to be described later. Specifically, the embodiment corresponding to this configuration is the third embodiment. The correction-coefficient adjusting unit 701 shown in FIG. 18, for example, corresponds to the correction unit of this configuration.

In the image-signal processing apparatus described above, the scene-judging unit can judge whether or not the input image signal is an image signal obtained by acquiring a prescribed scene or a prescribed subject on condition that the input image signal is contained in a prescribed region in the color space.

The image-signal processing apparatus described above preferably further comprises an enhancement-coefficient setting unit for setting an enhancement coefficient for determining a level of signal processing with the first correction coefficient, wherein the enhancement-coefficient setting unit sets the enhancement coefficient on the basis of the judgment result of the scene-judging unit.

With this configuration, setting of the enhancement coefficients for determining the level of signal processing for the first correction coefficients is performed in the enhancement-coefficient setting unit, and these enhancement coefficients are set according to the scene and the degree of importance of the pixels to be processed. Accordingly, it is possible to realize saturation enhancement and grayscale conversion by using optimum correction coefficients for each scene. For example, it possible to adjust the saturation such that, in skin-tone regions, the saturation of particularly bright regions is reduced without enhancing the saturation much, and in dark regions, the saturation in particular is reduced in low-luminance regions.

The following is a description of the above configuration, specifically associated with embodiments to be described later. Specifically, the embodiment corresponding to this configuration is the fourth embodiment. The table changing unit 801 shown in FIG. 23, for example, corresponds to the enhancement-coefficient setting unit in this configuration.

The image-signal processing apparatus described above preferably further comprises a re-adjustment unit for further adjusting the image signal after signal processing is performed using at least one of the first correction coefficient and the second correction coefficient, on the basis of the judgment result of the scene-judging unit.

With this configuration, the image signal on which signal processing is performed using at least one of the first correction coefficient and the second correction coefficient is re-adjusted by the re-adjustment unit according to the scene, the degree of importance of the pixels to be processed, and so on. Accordingly, it is possible to appropriately correct the final image according to the scene, the degree of importance of the pixels to be processed, and so on.

The following is a description of the above configuration, specifically associated with embodiments to be described later. Specifically, the embodiment corresponding to this configuration is the fifth embodiment. The color-correction unit 901 shown in FIG. 28, for example, corresponds to the re-adjustment unit in this configuration.

In the image-signal processing apparatus described above, preferably, the correction-coefficient adjusting unit performs adjustment so that at least one of the first correction coefficient and the second correction coefficient is limited to a prescribed range.

With this configuration, in the case of a prescribed scene or the like, because the image signal after processing is limited to a prescribed range, it is possible to obtain a high-quality image signal.

In the image-signal processing apparatus described above, preferably, the correction-coefficient adjusting unit adjusts a spatial frequency of at least one of the first correction coefficient and the second correction coefficient.

In the image-signal processing apparatus described above, preferably, the scene-judging unit judges whether or not the input image signal is an image signal obtained by acquiring the prescribed scene or the prescribed subject, conditioned on whether the luminance of the input image signal is a prescribed threshold or less, and the enhancement-coefficient setting unit sets the enhancement coefficient so that the level of signal processing becomes less when the condition is met.

With this configuration, the enhancement coefficient is set so that the level of signal processing becomes less depending on whether the luminance of the image signal is equal to or less than a prescribed threshold.

In the image-signal processing apparatus described above, preferably, the scene-judging unit judges whether or not the image signal is an image signal obtained by acquiring the prescribed scene or the prescribed subject according to the number of pixels in the image signal that satisfy the prescribed condition.

A third aspect of the present invention is an image-signal processing program stored in a computer readable medium for performing image-signal processing on an input image signal, the image-signal processing program causing a computer to execute: a step of performing first signal processing on the image signal from the image-acquisition device; a step of calculating a first correction coefficient on the basis of the image signal after performing the first signal processing; and a step of performing second signal processing on the image signal from the image-acquisition device using the first correction coefficient.

A fourth aspect of the present invention is an image-signal processing program stored in a computer readable medium for performing image-signal processing on an input image signal, the image-signal processing program causing a computer to execute: a step of performing reduction processing on the image signal from the image-acquisition device to generate a reduced image signal; a step of performing first signal processing on the reduced image signal; a step of calculating a first correction coefficient on the basis of the image signal after performing the first signal processing; and a step of performing second signal processing on the image signal from the image-acquisition device using the first correction coefficient.

The image-signal processing program described above preferably further comprises a step of setting a condition for judging whether or not the input image signal is obtained by acquiring a prescribed scene or a prescribed subject, wherein the type of processing performed in at least one of the first signal processing and the second signal processing is changed on the basis of whether or not the input image signal from the image-acquisition device meets the condition.

According to the present invention, because it is possible to reduce saturation enhancement failures, edge enhancement failures, and so forth when performing space-variant image-signal processing, an advantage is afforded in that it is possible to realize picture compositing having a balanced and uniform appearance over the entire image.

BEST MODE FOR CARRYING OUT THE INVENTION

An image-signal processing apparatus according to embodiments of the present invention will be described below with reference to the drawings.

First Embodiment

Figure 1:
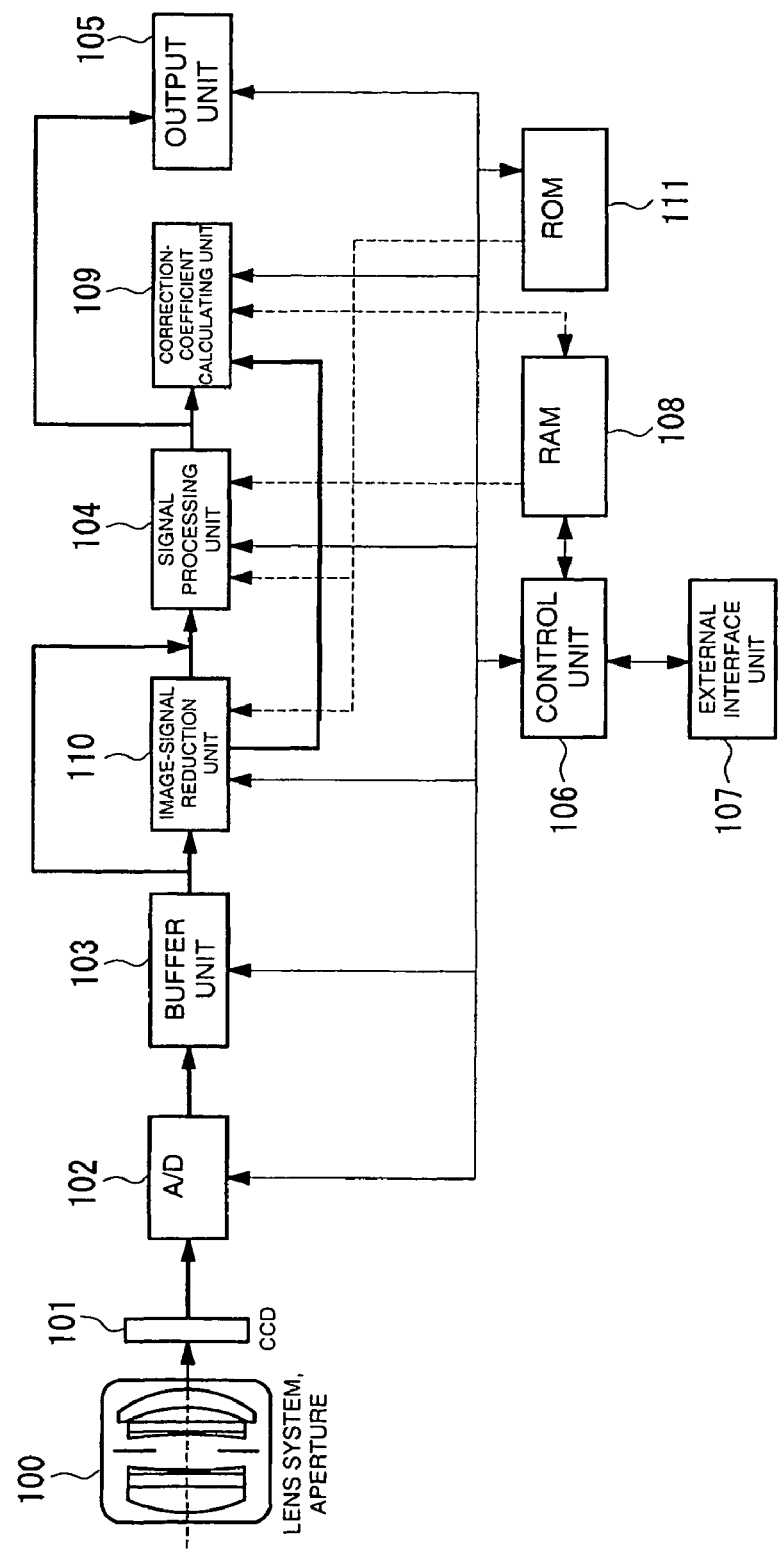
FIG. 1 is a block diagram showing, in outline, the configuration of an image-signal processing apparatus according to a first embodiment of the present invention.

FIG. 1 is a block diagram showing, in outline, the configuration of an image-signal processing apparatus according to a first embodiment of the present invention.

In FIG. 1, a lens system/aperture 100 and a CCD 101 are disposed along the optical axis. An A/D converter 102 is connected to a buffer unit 103. The buffer unit 103 is connected to a signal processing unit 104 via an image-signal reduction unit 110. The buffer unit 103 is also directly connected to the signal processing unit 104. A signal from the signal processing unit 104 can be transferred to a correction-coefficient calculating unit 109 and an output unit 105. A RAM 108 is connected to the signal processing unit 104 and is bidirectionally connected to the correction-coefficient calculating unit 109. The image-signal reduction unit 110 is connected to the correction-coefficient calculating unit 109. A ROM 111 is connected to the signal processing unit 104 and the image-signal reduction unit 110. A control unit 106 is bidirectionally connected to the A/D converter 102, the buffer unit 103, the image-signal reduction unit 110, the signal processing unit 104, the correction-coefficient calculating unit 109, the output unit 105, the RAM 108, and the ROM 111. The control unit 106 is also bidirectionally connected to an external interface unit 107. The external interface unit 107, for example, a power supply switch and a shutter button, switches between various modes when acquiring images.

Next, the flow of signals in the image-signal processing apparatus with the above configuration will be described.

After the image-capturing conditions such as the ISO sensitivity are set by the user via the external interface 107, upon pressing the shutter button (not shown), a picture signal captured via the lens system/aperture 100 and the CCD 101 is read out as an analog signal using a known correlated double sampling technique, is converted to a digital image signal in the A/D converter 102, and is transferred to the buffer unit 103. In this embodiment, the CCD 101 is assumed to be a single RGB primary-color CCD, and the signal grayscale range of the A/D converter 102 is, for example, 12 bits.

Then, processing is performed on the original image signal in the buffer unit 103, in other words, the image signal from the CCD 101, which is the image-acquisition device. However, in this embodiment, this processing is separated into two, namely, preprocessing and main processing. In the preprocessing, correction coefficients are calculated for performing space-variant grayscale conversion and picture compositing, and in the main processing, grayscale conversion and picture compositing are performed using the correction coefficients calculated in the preprocessing. The image obtained after completing the main processing is subjected to compression, such as the well-known JPEG compression, and is recorded in a memory card or the like by the output unit 105.

The preprocessing and the main processing will be described in more detail below.

In the preprocessing, the original image signal in the buffer unit 103 is first transferred to the image-signal reduction unit 110, where it is reduced to a prescribed size. In the description in this embodiment, the original image is assumed to be I pixels×J pixels, and the reduced image signal is assumed to be i pixels×j pixels. The reduction processing may employ a known method. For example, when the CCD 101 has a primary-color Bayer array, for an image reduction ratio of 1/4, first the image is divided into 4×4 blocks, and in each block, signals having the same attributes as the pixels in the upper-left block (R, B, Gr, or Gb) are further extracted. When pixel values representing the blocks are calculated by multiplying the extracted 2×2 blocks by a 2×2 low-pass filter, an image which is reduced to 1/4 is obtained.

The reduction ratio during that process may be a fixed value; however, the user can also freely set it via the external interface unit 107, or one of a plurality of image reduction ratios prepared in the ROM 111 may be specified by the user via the external interface unit 107.

Next, the image signal reduced in the image-signal reduction unit 110 is transferred to the signal processing unit 104 and the correction-coefficient calculating unit 109, where correction coefficients are calculated. There are two types of correction coefficients calculated in the preprocessing, first correction coefficients and second correction coefficients. Of these, the second correction coefficients are calculated for performing space-variant grayscale conversion, and the first correction coefficients are calculated for performing picture compositing with a uniform appearance with respect to this space-variant grayscale conversion. Here, the term picture compositing means, for example, saturation enhancement, edge enhancement, grayscale conversion, and so forth.

More specifically, in the calculation of the above-mentioned correction coefficients, first, the signal processing unit 104 calculates the second correction coefficients on the basis of the reduced image signal from the image-signal reduction unit 110, and stores them in the RAM 108. Then, it performs space-variant grayscale conversion on the reduced image signal on the basis of these second correction coefficients, performs other picture compositing such as saturation enhancement and edge enhancement on the basis of the fixed correction coefficients that are determined in advance (extracted from the ROM 111), and transfers the processed image signal to the correction-coefficient calculating unit 109. The fixed correction coefficients are stored in the ROM 111 in advance.

The correction-coefficient calculating unit 109 calculates the first correction coefficients on the basis of the image signal subjected to the space-variant picture compositing, transferred from the signal processing unit 104, and the reduced image signal transferred from the image-signal reduction unit 110. The first correction coefficients may be calculated for each pixel, or they may be calculated for each region formed by dividing the image signal into separate regions. The calculated first correction coefficients are stored in the same RAM 108 as the second correction coefficients. The preprocessing ends at this point.

Next, in the main processing, the original image signal in the buffer unit 103 is transferred again to the signal processing unit 104. The signal processing unit 104 performs grayscale conversion on the re-transferred original image signal using the second correction coefficients in the RAM 108, which are obtained in the preprocessing described above, and performs other picture compositing, for example, saturation enhancement and edge enhancement, using the first correction coefficients in the RAM 108, which are similarly obtained in the preprocessing described above.

Next, the signal processing unit 104 will be described in detail.

Figure 2:
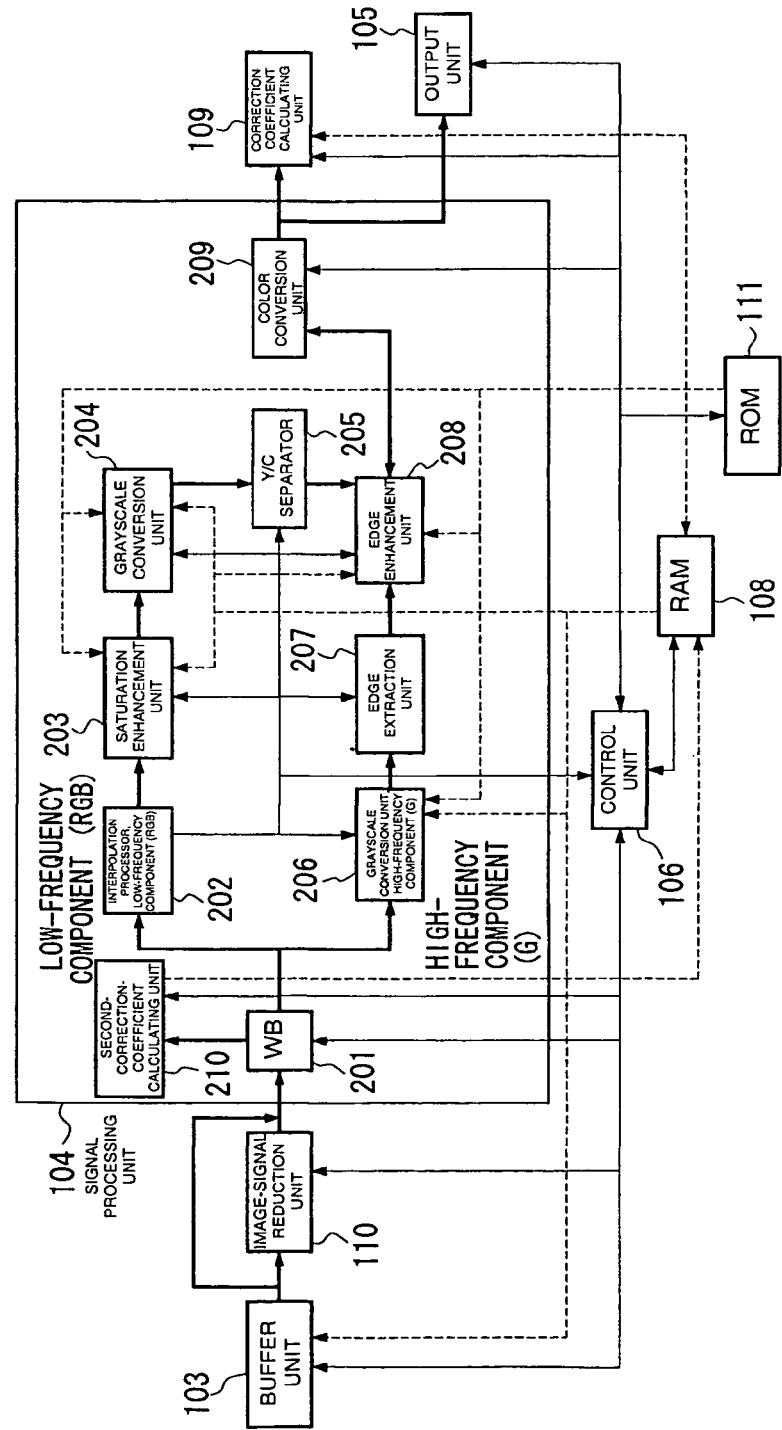
FIG. 2 is a block diagram showing an example configuration of a signal processing unit shown in FIG. 1.

FIG. 2 is a block diagram showing an example configuration of the signal processing unit 104. As shown in this figure, the signal processing unit 104 includes a WB (white balance) unit 201, an interpolation processor 202, a saturation enhancement unit 203, a grayscale conversion unit 204, a Y/C separator 205, a grayscale conversion processor 206, an edge extraction unit 207, and edge enhancement unit 208, a color conversion unit 209, and a second-correction-coefficient calculating unit 210.

The image-signal reduction unit 110 and the buffer unit 103 are connected to the WB unit 201. The WB unit 201 is connected to the interpolation processor 202, the grayscale conversion unit 206, and the second-correction-coefficient calculating unit 210. The interpolation processor 202 is connected to the Y/C separator 205 via the saturation enhancement unit 203 and the grayscale conversion unit 204. The grayscale conversion unit 206 is connected to the color conversion unit 209 via the edge extraction unit 207 and the edge enhancement unit 208. The Y/C separator 205 is connected to the edge enhancement unit 208.

The color conversion unit 209 is connected to the correction-coefficient calculating unit 109 and the output unit 105. The RAM 108 is connected to the saturation enhancement unit 203, the grayscale conversion unit 204, the grayscale conversion unit 206, and the edge enhancement unit 208. The ROM 111 is connected to the saturation enhancement unit 203, the grayscale conversion unit 204, the grayscale conversion unit 206, and the edge enhancement unit 208. The second-correction-coefficient calculating unit 210 is connected to the RAM 108. The control unit 106 is bidirectionally connected to the WB unit 201, the interpolation processor 202, the saturation enhancement unit 203, the grayscale conversion unit 204, the Y/C separator 205, the grayscale conversion unit 206, the edge extraction unit 207, the edge enhancement unit 208, the color conversion unit 209, and the second-correction-coefficient calculating unit 210.

In the signal processing unit 104 configured in this way, first, in the preprocessing described above, the image signal reduced by the image-signal reduction unit 110 is transferred to the WB unit 201. The WB unit 201 performs known white-balance correction on this reduced image signal. The image signal from the WB unit 201 is transferred to the second-correction-coefficient calculating unit 210, the interpolation processor 202, and the grayscale conversion unit 206.

In the main processing on the other hand, the original image signal is directly transferred to the WB unit 201 from the buffer unit 103. The WB unit 201 performs known white-balance correction on this original image signal and transfers the corrected image signal to the interpolation processor 202 and the grayscale conversion unit 206. Thus, in the main processing, the image signal is not transferred to the second-correction-coefficient calculating unit 210.

In the preprocessing, the second-correction-coefficient calculating unit 210 calculates the second correction coefficients to be used in the space-variant grayscale conversion. For example, as disclosed in the Publication of Japanese Patent No. 3465226, the texture of the image signal to be processed is analyzed and the image signal is divided into a plurality of regions on the basis of the analysis results. In other words, to divide the image into a plurality of regions, each pixel value is associated with one of the regions. For the divided regions, first, a density histogram of the pixel values in each region is created, and the variation of the density values of the density histogram is calculated. Next, a clip value which governs the level of smoothing of the calculated density histogram is determined according to this variation. The density histogram is clipped using the determined clip value, and a cumulative histogram is created from the clipped density histograms. Finally, a second correction coefficient $g2_{ij}$ (the subscripts i and j are coordinate values in the reduced image signal; the same applies in the following) is calculated for each pixel or each region on the basis of the cumulative histogram and is stored in the RAM 108.

In the main processing on the other hand, the second-correction-coefficient calculating unit 210 does not operate.

In the preprocessing, the interpolation processor 202 subjects the signal from the WB unit 201 to known interpolation to generate three images from a single image and transfers them to the saturation enhancement unit 203.

The saturation enhancement unit 203 performs saturation enhancement, for example, in the following conversion order: RGB signal, YCrCb signal, CrCb enhancement, and RGB signal. More concretely, the saturation enhancement unit 203 converts the RGB signal to a YCrCb signal by multiplying the RGB signal by a 3×3 matrix for YCrCb conversion, under the control of the control unit 106. Next, fixed correction coefficients $g_0$ stored in advance in the ROM 111 are read out from the ROM 111, saturation-enhancement coefficients $K_0$ for CrCb enhancement are calculated using Equation (1) below, and a 3×3 matrix formed of the saturation-enhancement coefficients $K_0$ for CrCb enhancement is created. Then, CrCb enhancement is performed by multiplying the YCrCb signal by this 3×3 matrix for CrCb enhancement. Finally, by multiplying the YCrCb signal subjected to CrCb enhancement by a 3×3 matrix for RBG conversion, the CrCb-enhanced YCrCb signal is converted to an R'G'B' signal. The procedure described above can be represented by Equation (2) below.

$$K_0 = \text{Color}(Y\_\text{low} * g_0) \quad (1)$$

Here, Color( ) is a function defined in advance showing the relationship between Y_low*$g_0$ and $K_0$ (Y_low is the brightness level, $K_0$ is the coefficient for the CrCb level enhancement, and $g_0$ is the fixed correction coefficient).

$$[R'\ G'\ B'] = [R\ G\ B] * \begin{bmatrix} a11 & a12 & a13 \\ a21 & a22 & a23 \\ a31 & a32 & a33 \end{bmatrix} * \begin{bmatrix} 1 & 0 & 0 \\ 0 & K_0 & 0 \\ 0 & 0 & K_0 \end{bmatrix} * \begin{bmatrix} a'11 & a'12 & a'13 \\ a'21 & a'22 & a'23 \\ a'31 & a'32 & a'33 \end{bmatrix} \quad (2)$$

for YCrCb conversion; for CrCb enhancement; for RGB conversion

In the main processing on the other hand, the saturation enhancement unit 203 converts the RGB signal to a YCrCb signal by multiplying the RGB signal by the 3×3 matrix for YCrCb conversion under the control of the control unit 106. Then, a first correction coefficient $g1_{IJ}$ (the subscripts I and J are coordinate values of the pixel or region of the original image; the same applies in the following) corresponding to each pixel or region is read out from the RAM 108 (the first correction coefficients are calculated in the correction-coefficient calculating unit 109), saturation-enhancement coefficients $K_{IJ}$ for CrCb enhancement are calculated according to Equation (3) below, and a 3×3 matrix is created from the saturation-enhancement coefficients $K_{IJ}$ for CrCb enhancement. Then, CrCb enhancement is performed by multiplying the YCrCb signal by the 3×3 matrix for CrCb enhancement. Finally, the CrCb-enhanced YCrCb signal is converted to an $R_{IJ}'G_{IJ}'B_{IJ}'$ signal by multiplying the CrCb-enhanced YCrCb signal by a 3×3 matrix for RGB conversion. The procedure described above can be represented by Equation (4) below.

Figure 3:
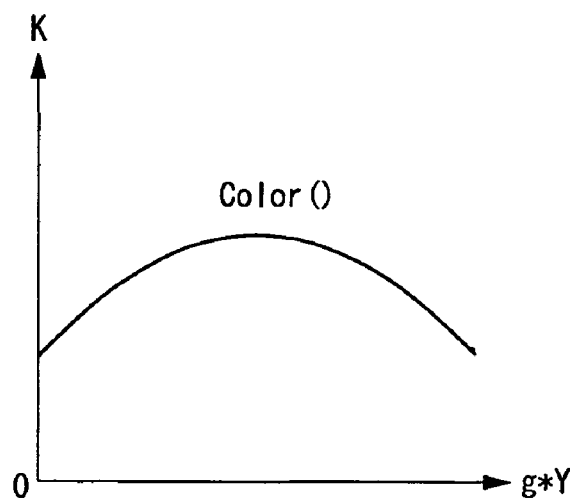
FIG. 3 is a diagram showing an example graph of the relationship between an enhancement coefficient K for saturation enhancement, and a luminance level Y and first correction coefficient g, in RGB color space.

FIG. 3 is graph showing an example of the relationship between the saturation-enhancement coefficient K for the saturation enhancement in RGB color space, and the brightness level Y and the first correction coefficient g. As shown in this graph, regarding the product g*Y of the first correction coefficient g and the brightness level Y, the saturation-enhancement coefficient K is set to be large in the central area, and the saturation-enhancement coefficient K is set so as to gradually reduce as the product g*Y decreases and increases at the boundaries of the central region. By setting the saturation-enhancement coefficient K in this way, if the saturation becomes too large, the image can be made to appear more uniform by reducing the saturation, for example, by performing grayscale conversion.

$$K_{IJ} = \text{Color}(Y\_low * g1_{IJ}) \tag{3}$$

Here, Color( ) is a function defined in advance showing the relationship between Y_low*g1$_{IJ}$, the saturation-enhancement coefficient K$_{IJ}$ (Y_low is the luminance level, K$_{IJ}$ is the saturation-enhancement coefficient for CrCb level enhancement at each pixel or each region, and g1$_{IJ}$ is the first correction coefficient for each pixel or each region).

$$[R'_{ij}\ G'_{ij}\ B'_{ij}] = [R_{ij}\ G_{ij}\ B_{ij}] * \begin{bmatrix} a11 & a12 & a13 \\ a21 & a22 & a23 \\ a31 & a32 & a33 \end{bmatrix} * \begin{bmatrix} 1 & 0 & 0 \\ 0 & K_{IJ} & 0 \\ 0 & 0 & K_{IJ} \end{bmatrix} * \begin{bmatrix} a'11 & a'12 & a'13 \\ a'21 & a'22 & a'23 \\ a'31 & a'32 & a'33 \end{bmatrix} \tag{4}$$

for YCrCb conversion ⋯ for CrCb enhancement ⋯ for RGB conversion

In the saturation enhancement described above, the conversion of the RGB signal and the YCrCb signal is realized by matrix multiplication, but it can be performed using an LUT. For example, a plurality of RGB color conversion tables corresponding to the first correction coefficient levels may be set in advance in the ROM 111, and when saturation enhancement is to be performed, the first correction coefficient corresponding to each pixel or each region in the image signal is extracted from the RAM 108, and color conversion (RGB, R'G'B') is performed based on the color conversion table corresponding to that first correction coefficient from the plurality of RGB color conversion tables stored in the ROM 111.

In this embodiment, saturation enhancement is performed in RGB color space; however, in order to obtain colors that are preferable for the human vision system, it is possible to perform saturation enhancement in L*a*b* color space.

The processing in the saturation enhancement unit 203 when performing saturation enhancement in L*a*b* color space is described below.

In this case, the saturation enhancement unit 203 performs saturation enhancement, for example, in the following conversion order: RGB signal, L*a*b* signal, a*b* enhancement, and RGB signal. A color conversion table for converting from the RGB signal to the L*a*b* signal and a color conversion table for converting from the L*a*b* signal to the RGB signal are set in the ROM 111 in advance.

In the preprocessing, first, the saturation enhancement unit 203 extracts the color conversion table for converting the RGB signal to the L*a*b* signal from the ROM 111 under the control of the control unit 106 and converts the RGB signal to the L*a*b* signal. Then, a fixed correction coefficient g$_0$ for each pixel is read out from the ROM 111, saturation-enhancement coefficients H$_0$ for L*a*b* enhancement are calculated on the basis of Equation (5) below, and a 3×3 matrix formed of the saturation-enhancement coefficients H$_0$ for a*b* enhancement is created. Then, a*b* enhancement is performed by multiplying the L*a*b* signal by the 3×3 matrix for a*b* enhancement. Finally, the color conversion table for converting from the L*a*b* signal to the RGB signal is read out from the ROM 111, and the a*b*-enhanced L*a*b* signal is converted to the R'G'B' signal by multiplying the a*b*-enhanced L*a*b* signal by this color conversion table. The procedure described above can be represented by Equation (6).

$$H_0 = \text{Color\_L}(L * g_0) \tag{5}$$

$$\begin{bmatrix} R \\ G \\ B \end{bmatrix} \xrightarrow[\text{conversion}]{\substack{LUT \\ \text{for } L*a*b}} \begin{bmatrix} L \\ a \\ b \end{bmatrix} * \begin{bmatrix} 1 & 0 & 0 \\ 0 & H_0 & 0 \\ 0 & 0 & H_0 \end{bmatrix} \xrightarrow[\text{conversion}]{\substack{LUT \\ \text{for } RGB}} \begin{bmatrix} R' \\ G' \\ B' \end{bmatrix} \tag{6}$$

In the main processing, first, the saturation enhancement unit 203 extracts the color conversion table for converting the RGB signal to the L*a*b* signal from the ROM 111 under the control of the control unit 106 and converts the RBG signal to the L*a*b* signal by multiplying the RGB signal by this color conversion table. Then, the saturation enhancement unit 203 reads out a first correction coefficient g1$_{IJ}$ corresponding to each pixel or each region from the RAM 108, calculates saturation-enhancement coefficients H$_{IJ}$ for a*b* enhancement on the basis of Equation (7) below, and creates a 3×3 matrix formed of the saturation-enhancement coefficients H$_{IJ}$ for a*b* enhancement. Then, a*b* enhancement is performed by multiplying the L*a*b* signal by the 3×3 matrix for a*b* enhancement. Finally, the color conversion table for converting from the L*a*b* signal to the RGB signal is read out from the ROM 111, and the a*b*-enhanced L*a*b* signal is converted to an R$_{IJ}$'G$_{IJ}$'B$_{IJ}$' signal by multiplying the a*b*-enhanced L*a*b* signal by this color conversion table. The procedure described above can be represented by Equation (8) below.

$$H_{IJ} = \text{Color\_L}(L * g1_{IJ}) \tag{7}$$

$$\begin{bmatrix} R_{IJ} \\ G_{IJ} \\ B_{IJ} \end{bmatrix} \xrightarrow[\text{conversion}]{\substack{LUT \\ \text{for } L*a*b}} \begin{bmatrix} L_{IJ} \\ a_{IJ} \\ b_{IJ} \end{bmatrix} * \begin{bmatrix} 1 & 0 & 0 \\ 0 & H_{IJ} & 0 \\ 0 & 0 & H_{IJ} \end{bmatrix} \xrightarrow[\text{conversion}]{\substack{LUT \\ \text{for } RGB}} \begin{bmatrix} R'_{IJ} \\ G'_{IJ} \\ B'_{IJ} \end{bmatrix} \tag{8}$$

The saturation enhancement in L*a*b* space can be performed using an LUT instead of matrix multiplication. For example, a plurality of L*a*b* color conversion tables corresponding to the first correction coefficient levels are set in the ROM 111 in advance, and when saturation enhancement is to be performed, the first correction coefficient corresponding to each pixel in the image signal is extracted from the RAM 108. Then, the color conversion table corresponding to the first correction coefficient may be read out from the plurality of L*a*b* color conversion tables stored in the ROM 111, and color conversion, namely, conversion from the L*a*b* signal to an L*'a*'b*' signal, may be performed using this color conversion table.

Figure 4:
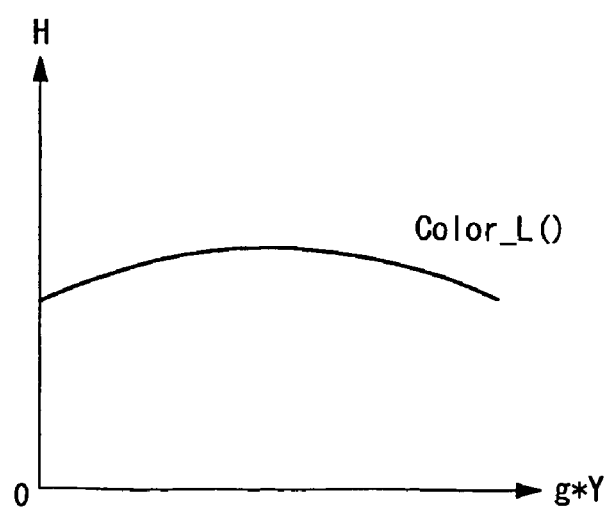
FIG. 4 is a diagram showing an example graph of the relationship between an enhancement coefficient H for saturation enhancement, and a brightness level L and first correction coefficient g, in L*a*b* color space.

FIG. 4 shows a graph of the relationship between the saturation-enhancement coefficient H for the saturation enhancement in L*a*b* color space, and the brightness level L and the first correction coefficient g.

Then, the image signal subjected to saturation enhancement, such as that described above, by the saturation enhancement unit 203 is transferred to the grayscale conversion unit 204 under the control of the control unit 106.

Figure 5:
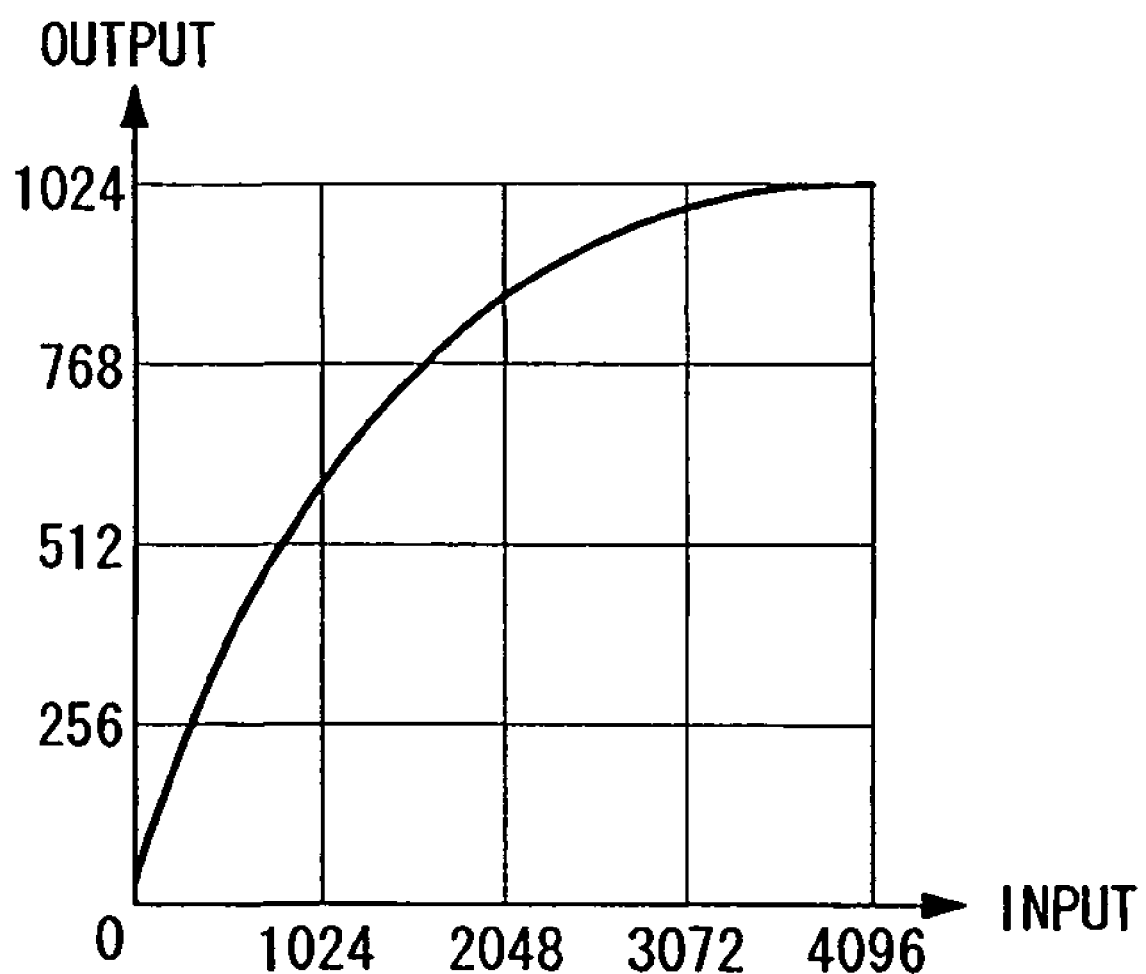
FIG. 5 is a diagram showing an example γ-characteristic for grayscale conversion according to the first embodiment of the present invention.

The grayscale conversion unit 204 performs grayscale conversion on the basis of a γ-characteristic. In this embodiment, as shown in FIG. 5, 12-bit RGB data is converted to 10 bits. Details of the processing performed by the grayscale conversion unit 204 are described below.

In the preprocessing, the grayscale conversion unit 204 first extracts a second correction coefficient $g2_{ij}$ from the RAM 108 and performs grayscale conversion by multiplying the RGB data which is converted to 10 bits by the second correction coefficient $g2_{ij}$ corresponding to each pixel or each region, as shown in Equation (9-1) below.

$$M_{ij} = P_{ij} * g2_{ij} \qquad (9\text{-}1)$$

In Equation (9-1) above, $P_{ij}$ is a pixel value ($R_{ij}$, $G_{ij}$, $B_{ij}$) for each pixel or each region after the reduced image signal is processed in the saturation enhancement unit 203, and $M_{ij}$ is a pixel value ($R_{ij}$, $G_{ij}$, $B_{ij}$) for each pixel or each region after grayscale conversion.

In the main processing on the other hand, the grayscale conversion unit 204 first reads out the second correction coefficients $g2_{ij}$ from the RAM 108. Because the second correction coefficients $g2_{ij}$ which are read out are calculated for the reduced image signal, the interpolated second correction coefficients $g2_{IJ}$ corresponding to the original image are determined by interpolating the correction coefficients corresponding to the missing pixels or regions so as to be associated with each pixel or each region of the original image signal. Then, grayscale conversion is performed by multiplying the 10-bit RGB data after the conversion described above by the second correction coefficients $g2_{IJ}$ corresponding to the original image signal, as shown in Equation (9-2) below. If the multiplied pixel value exceeds the upper limit of the 10 bits, the grayscale conversion unit 204 sets it to the upper limit.

$$M_{IJ} = P_{IJ} * g2_{IJ} \qquad (9\text{-}2)$$

In Equation (9-2) above, $P_{IJ}$ is the pixel value ($R_{IJ}$, $G_{IJ}$, $B_{IJ}$) of each pixel or each region after processing in the saturation enhancement unit 203, and $M_{IJ}$ is the pixel value ($R_{IJ}$, $G_{IJ}$, $B_{IJ}$) of each pixel or each region after grayscale conversion.

The image signal after grayscale conversion is transferred to the Y/C separator 205 under the control of the control unit 106. The Y/C separator 205 performs known Y/C separation under the control of the control unit 106. A separated luminance signal Y_low and color-difference signal CrCb are transferred to the edge enhancement unit 208.

Next, another route via which the image signal is input from the WB unit, namely, the grayscale conversion unit 206, the edge extraction unit 207, and the edge enhancement unit 208, will be described in detail.

First, in the preprocessing, the grayscale conversion unit 206 extracts only the G signal from the single image transferred from the WB unit 201 and converts the 12-bit data to 10 bits. Then, it reads out the second correction coefficients $g2_{ij}$ from the RAM 108 and performs grayscale conversion by multiplying the G signal data by these second correction coefficients at each pixel or each region.

In the main processing on the other hand, the second correction coefficients $g2_{ij}$ are read out from the RAM 108, and the second correction coefficients $g2_{IJ}$ corresponding to the original image signal are obtained by performing interpolation on these second correction coefficients $g2_{ij}$. Then, grayscale conversion is performed by multiplying the G signal data by the interpolated second correction coefficients $g2_{IJ}$ at each pixel or each region.

The processed signal is transferred to edge extraction unit 207.

The edge extraction unit 207 extracts an edge intensity E by performing known edge extraction under the control of the control unit 106 and transfers it to the edge enhancement unit 208.

In the preprocessing, the edge enhancement unit 208 first reads out the fixed correction coefficients from the ROM 111 and performs edge enhancement using the fixed correction coefficients together with the luminance signal Y_low from the Y/C separator 205 and the edge intensity E from the edge extraction unit 207.

In the main processing on the other hand, the edge enhancement unit 208 reads out the first correction coefficient corresponding to each pixel from the RAM 108, under the control of the control unit 106, and performs edge enhancement using this first correction coefficient together with the luminance signal Y_low from the Y/C separator 205 and the edge intensity E from the edge extraction unit 207.

The edge enhancement described above includes edge-intensity control, coring control, and chroma-suppression control. The processed signal is transferred to the color conversion unit 209.

Next, the edge enhancement unit 208 mentioned above will be described in more detail.

Figure 6:
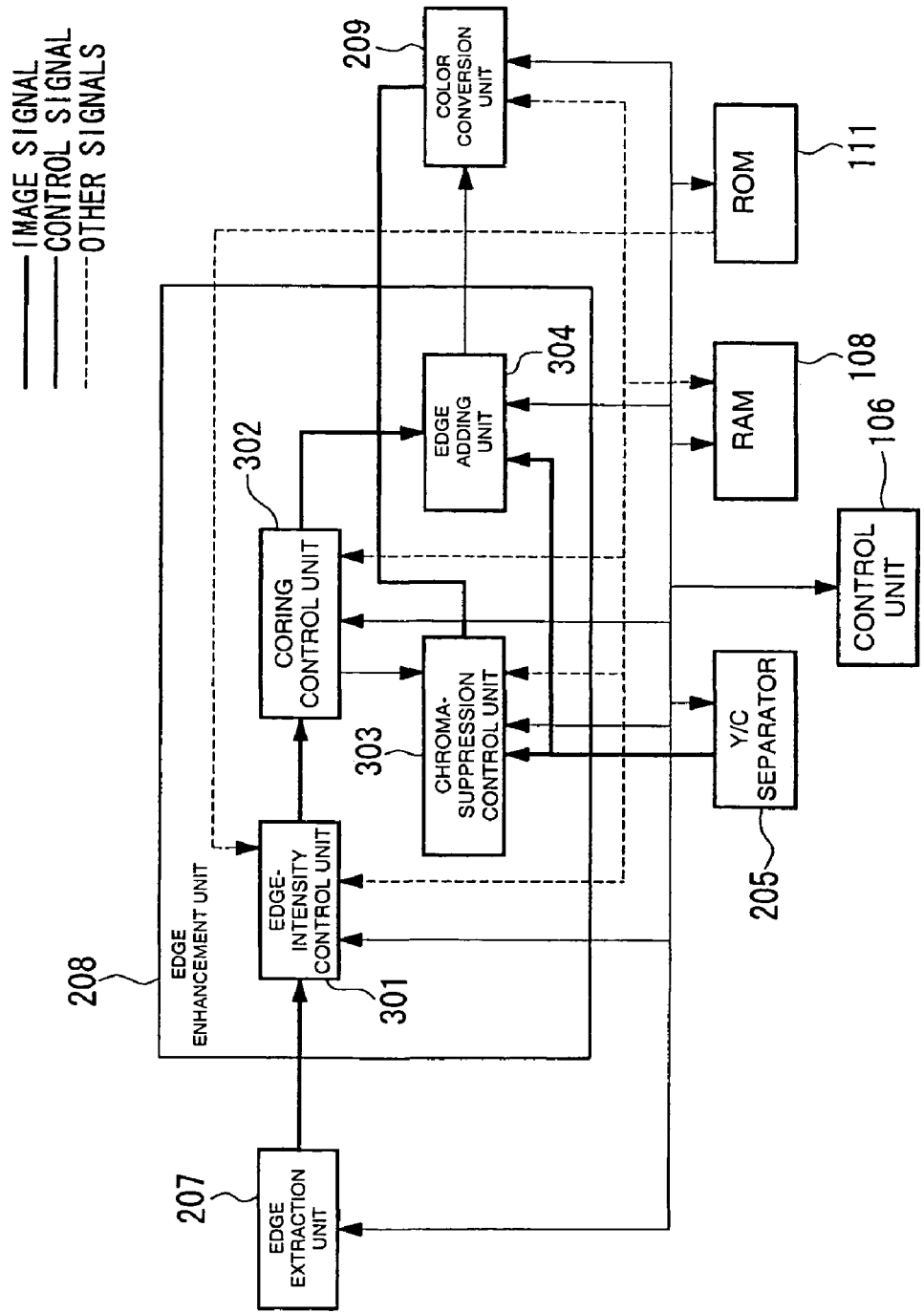
FIG. 6 is a diagram showing an example configuration of an edge enhancement unit shown in FIG. 1.

FIG. 6 is a block diagram showing an example configuration of the edge enhancement unit 208. As shown in this figure, the edge enhancement unit 208 includes an edge-intensity control unit 301, a coring control unit 302, a chroma-suppression control unit 303, and an edge-adding unit 304.

The edge extraction unit 207 is connected to the edge-intensity control unit 301. The edge-intensity control unit 301 is connected to the coring control unit 302. The chroma-suppression control unit 303 is connected to the color conversion unit 209. The edge-adding unit 304 is connected to the color conversion unit 209. The coring control unit 302 is connected to the chroma-suppression control unit 303 and the edge-adding unit 304. The Y/C separator 205 is connected to the chroma-suppression control unit 303 and the edge-adding unit 304. The RAM 108 is bidirectionally connected to the edge-intensity control unit 301, the coring control unit 302, and the chroma-suppression control unit 303. The ROM 111 is connected to the edge-intensity control unit 301. The control unit 106 is bidirectionally connected to the edge-intensity control unit 301, the coring control unit 302, the chroma-suppression control unit 303, and the edge-adding unit 304.

In the edge enhancement unit 208 having such a configuration, first, the flow of signals in the preprocessing will be described.

In the preprocessing, the edge intensity E is transferred from the edge extraction unit 207 and the luminance signal Y_low is transferred from the Y/C separator 205 under the control of the control unit 106. The edge-intensity control unit 301 reads out the fixed correction coefficient $g_0$ stored in the ROM 111, calculates an edge-enhancement gain $Eg_0$ using this correction coefficient $g_0$ and the luminance signal Y_low described above, according to Equation (10) below, and transfers this gain $Eg_0$ to the coring control unit 302.

$$Eg_0 = \text{Edge\_gain}(Y\_\text{low} * g_0) \qquad (10)$$

Figure 7:
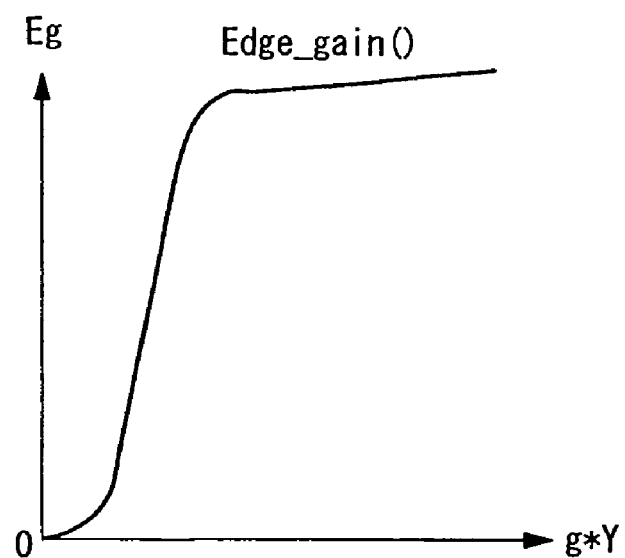
FIG. 7 is a diagram showing an example graph of the relationship between an enhancement gain Eg for edge enhancement, and a luminance level Y and first correction coefficient g.

Here, Edge_gain( ) is a predetermined function defining the relationship between $Eg_0$ and $Y\_low*g$ (see FIG. 7).

The coring control unit 302 performs coring processing according to Equation (11) below and corrects the edge intensity E from the edge extraction unit 207 according to Equation (12).

$$\text{If}(-X1 \leq E \geq X1) E = 0$$

$$\text{Else if}(E \geq = X1) E = E - X1$$

$$\text{Else } E = E + X1 \tag{11}$$

In Equation (11), X1 is a constant.

$$E_0' = Eg_0 * E$$

$$\text{If}(E_0' > X2) E_0' = X2$$

$$\text{If}(E_0' < -X2) E_0' = -X2 \tag{12}$$

In Equation (11) and Equation (12) above, X1 and X2 are constants, and X2>X1. Also, $E0'$ is the edge intensity after coring processing and correction using the gain.

The edge intensity $E_0'$ calculated as described above is transferred to the chroma-suppression control unit 303 and the edge-adding unit 304.

The chroma-suppression control unit 303 first calculates a chroma-suppression gain $Sg_0$ according to Equation (13) below.

$$Sg_0 = X3 - C*|E_0'|$$

$$\text{If}(Sg_0 < X4) Sg_0 = X4$$

$$\text{If}(Sg_0 > X3) Sg_0 = X3 \tag{13}$$

In Equation (13) above, X3, X4, and C are constants, and X3>X4.

Next, the chroma-suppression control unit 303 corrects the color-difference signal CrCb by performing chroma suppression using the chroma-suppression gain $Sg_0$, according to Equation (14) below, and transfers the corrected color-difference signal CrCb to the color conversion unit 209.

$$Cb = Sg_0/X3 * Cb$$

$$Cr = Sg_0/X3 * Cr \tag{14}$$

The edge-adding unit 304, on the other hand, performs addition processing using the corrected edge intensity $E_0'$ transferred from the coring control unit 302 and the luminance signal Y_low transferred from the Y/C separator 205 and transfers the addition result to the color conversion unit 209.

Next, the signal flow in the main processing in the edge enhancement unit 208 will be described.

In the main processing, the edge-intensity control unit 301 first calculates an enhancement gain $Eg_{IJ}$ for the edge enhancement, according to Equation (15) below, using the luminance signal Y_low obtained from the Y/C separator 205 and the first correction coefficient $g1_{IJ}$ corresponding to each pixel, which is read out from the RAM 108, and transfers the calculated enhancement gain $Eg_{IJ}$ to the coring control unit 302.

FIG. 7 is a graph showing the relationship between the enhancement gain Eg for the edge enhancement, and the luminance level Y and the first correction coefficient g. As shown in this graph, the enhancement gain $E_g$ is set to a small value in the region where the product $g*Y$ of the luminance level Y and the first correction coefficient g is low. Accordingly, it is possible to perform adjustment so that edge enhancement is performed more weakly as the luminance decreases.

$$Eg_{IJ} = \text{Edge\_gain}(Y\_low_{IJ} * g1_{IJ}) \tag{15}$$

The coring control unit 302 performs coring processing according to Equation (16) below and corrects the edge intensity $E_{ij}$ from the edge extraction unit 207 using the enhancement gain $Eg_{IJ}$ obtained from the edge-intensity control unit 301, according to Equation (17) below.

$$\text{If}(-X1 < E_{IJ} < X1) E_{IJ} = 0$$

$$\text{Else if}(E_{IJ} \geq = X1) E_{IJ} = E_{IJ} - X1$$

$$\text{Else } E_{IJ} = E_{IJ} + X1 \tag{16}$$

$$E_{IJ}' = Eg_{IJ} * E_{ij}$$

$$\text{If}(E_{IJ}' > X2) E_{IJ}' = X2$$

$$\text{If}(E_{IJ}' < -X2) E_{IJ}' = -X2 \tag{17}$$

X1 in Equation (16) above and X2 in Equation (17) above are constants, and X2>X1. $E_{IJ}'$ is an edge intensity after the coring and the correction using the gain.

Figure 8:
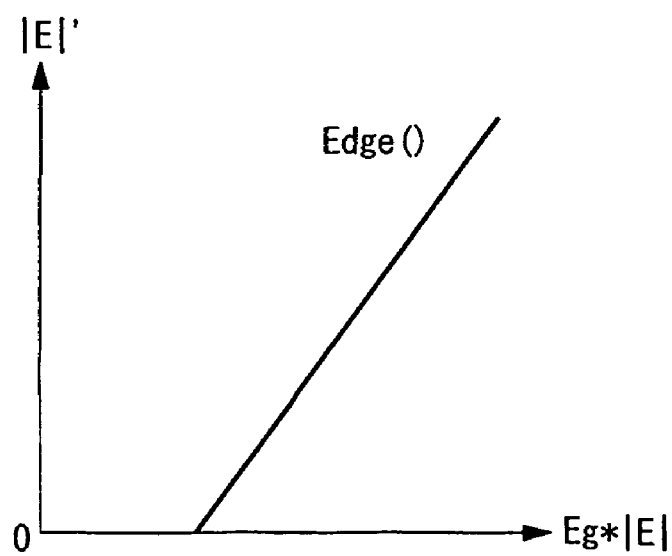
FIG. 8 is a diagram showing an example graph of the relationship between an edge intensity |E|' after correction, and the enhancement gain Eg and edge intensity |E| before correction.

FIG. 8 is a graph showing the relationship between the edge intensity |E|' after correction, and the enhancement gain $E_g$ and the edge intensity |E| before correction.

The edge intensity $E_{IJ}'$ calculated as described above is transferred to the chroma-suppression control unit 303 and the edge-adding unit 304.

The chroma-suppression control unit 303 first calculates a gain $Sg_{IJ}$ for chroma suppression on the basis of Equation (18) below.

$$Sg_{IJ} = X3 - C*|E_{IJ}'|$$

$$\text{If}(Sg_{IJ} < X4) Sg_{IJ} = X4$$

$$\text{If}(Sg_{IJ} > X3) Sg_{IJ} = X3 \tag{18}$$

In Equation (18), X3, X4, and C are constants and X3>X4.

Next, the chroma-suppression control unit 303 performs chroma suppression according to Equation (19) below using the enhancement gain $Sg_{IJ}$ for chroma suppression, corrects the color-difference signal CrCb, and transfers the corrected color-difference signal CrCb to the color conversion unit 209.

$$Cb_{IJ} = Sg_{IJ}/X3 * Cb_{IJ}$$

$$Cr_{IJ} = Sg_{IJ}/X3 * Cr_{IJ} \tag{19}$$

Figure 9:
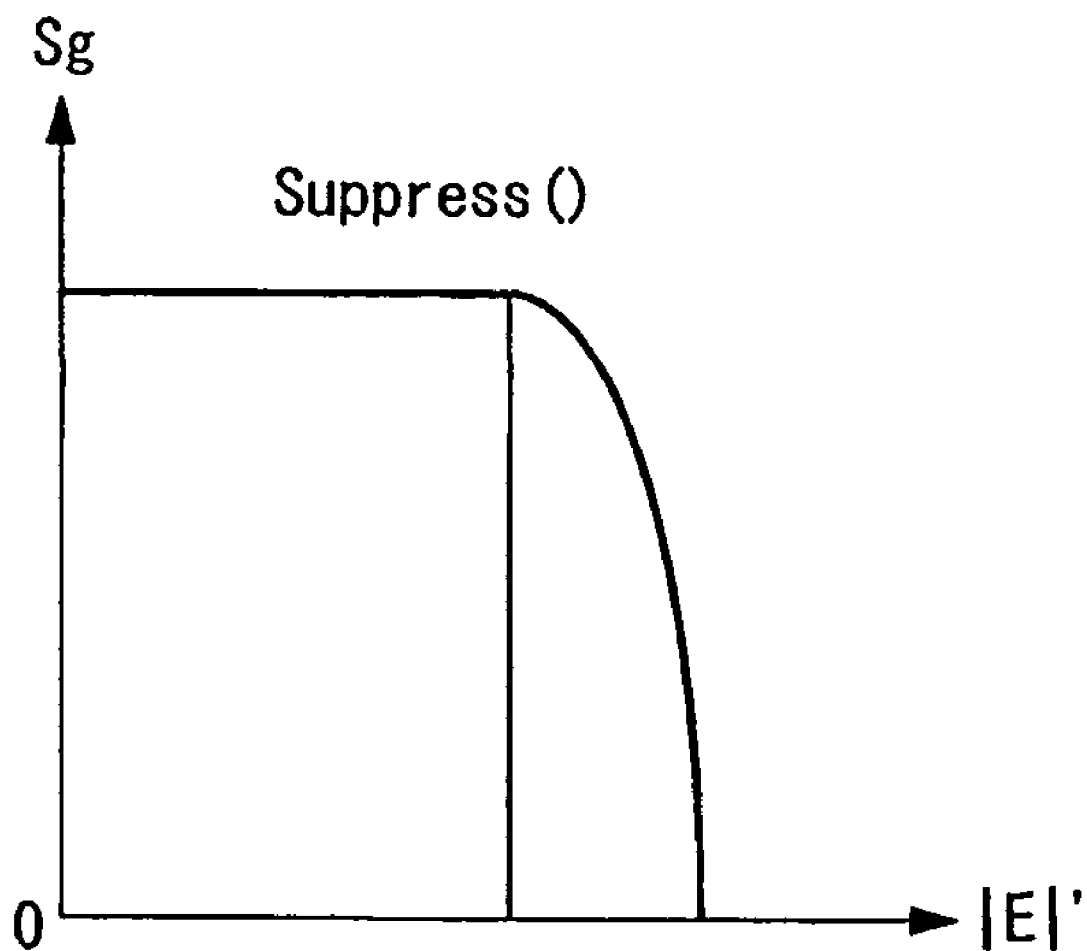
FIG. 9 is a diagram showing an example graph of the relationship between an enhancement gain Sg for chroma suppression and the edge intensity |E|'.

FIG. 9 is a graph showing the relationship between the enhancement gain Sg for chroma suppression and the edge intensity |E|'.

The edge-adding unit 304 performs addition processing using the edge intensity $E_{IJ}'$ transferred from the coring control unit 302 and the luminance signal Y_low transferred from the Y/C separator 205 and transfers the addition result to the color conversion unit 209.

Under the control of the control unit 106, the color conversion unit 209 converts the luminance signal and the color-difference signal from the edge enhancement unit 208 (see FIG. 2) to an RGB signal using a known color conversion method and transfers it to the correction-coefficient calculating unit 109 and the output unit 105.

Next, the correction-coefficient calculating unit 109 will be described in detail with reference to FIG. 10.

Figure 10:
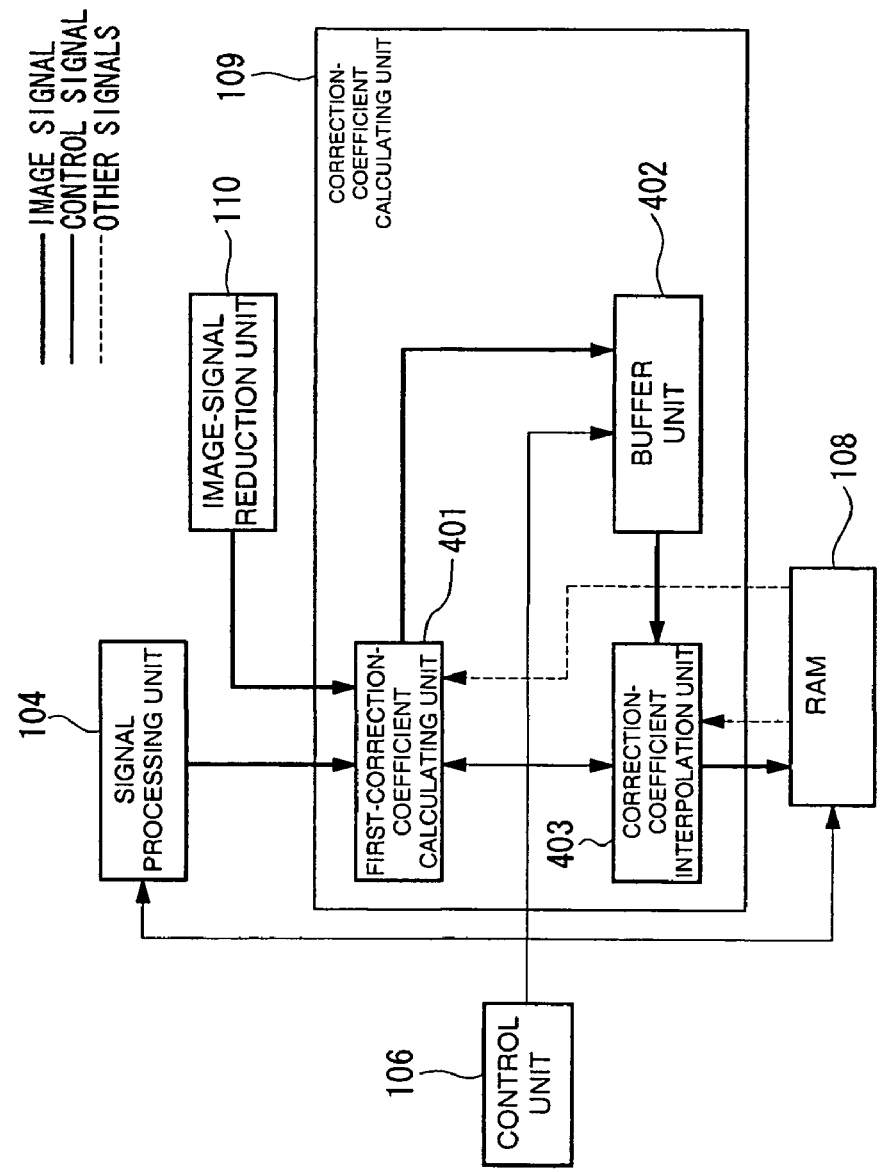
FIG. 10 is a diagram showing, in outline, the configuration of the correction-coefficient calculating unit shown in FIG. 1.

FIG. 10 is a block diagram showing, in outline, the configuration of the correction-coefficient calculating unit 109. As shown in this figure, the correction-coefficient calculating unit 109 includes a first-correction-coefficient calculating unit 401, a buffer unit 402, and a correction-coefficient interpolation unit 403.

The signal processing unit 104 and the image-signal reduction unit 110 are connected to the correction-coefficient interpolation unit 403 via the first-correction-coefficient calculating unit 401 and the buffer unit 402. The correction-coefficient interpolation unit 403 is connected to the RAM 108. The control unit 106 is bidirectionally connected to the first-correction-coefficient calculating unit 401, the buffer unit 402, and the correction-coefficient interpolation unit 403. The RAM 108 is connected to the first-correction-coefficient calculating unit 401 and the correction-coefficient interpolation unit 403.

Next, the signal flow in the correction-coefficient calculating unit 109 will be described.

In preprocessing, the image-processed image signal from the signal processing unit 104 and the image signal, before processing, from the image-signal reduction unit 110 are transferred to the first-correction-coefficient calculating unit 401.

On the basis of these image signals, the first-correction-coefficient calculating unit 401 calculates, for each pixel, a first correction coefficient $g1_{ij}$ of target pixels corresponding to the reduced image, according to Equation (20) below. Because the image signal before processing is a single image signal, the first-correction-coefficient calculating unit 401 first extracts, for each pixel, an image signal having the same color characteristics as the image signal before processing from three image signals after processing and calculates the first correction coefficient $g1_{ij}$ using the extracted image signal. For example, when the image signal before processing is R at the target pixel, it extracts the R signal of the corresponding image signal after processing to define the value of the image signal after processing.

$$g1_{ij} = \text{(a value of image signal after processing)}/\text{(a value of image signal before processing)} \quad (20)$$

With the coordinates of the region assumed to be i and j, the first correction coefficient $g1_{ij}$ is calculated for each region on the basis of a representative value of the image signal in the region after processing and a representative value of the image signal in the region before processing. The representative value means the average value or the maximum value of each region.

The calculated first correction coefficients $g1_{ij}$ are sequentially transferred to the buffer unit 402 on the basis of a signal from the control unit 106. Then, once the first correction coefficients for all pixels are contained in the buffer unit 402, the first correction coefficients are transferred from the buffer unit 402 to the correction-coefficient interpolation unit 403.

The correction-coefficient interpolation unit 403 extracts the size of the original image signal from the RAM 108 and, by performing interpolation based on the first correction-coefficients transferred from the buffer unit 402, transfers the interpolation-processed first correction coefficients $g1_{IJ}$ corresponding to the original image, in other words, the first correction-coefficients $g1_{IJ}$ corresponding to each pixel of the original image signal, to the RAM 108.

Accordingly, the first correction coefficients $g1_{IJ}$ corresponding to the original image signal are stored in the RAM 108 to be used in the main processing as described above.

As described above, with the image-signal processing apparatus according to this embodiment, the second correction coefficients corresponding to space-variant signal processing are calculated in preprocessing, and the first correction coefficients are calculated using the calculated second correction coefficients. Then, in the main processing, using the first correction coefficients and the second correction coefficients obtained in the preprocessing, saturation enhancement, edge enhancement, and space-variant grayscale conversion are performed on the image signal from the image-acquisition device. Therefore, it is possible to eliminate any appearance of nonuniformity in the saturation enhancement, edge enhancement and so forth, arising from the space-variant grayscale conversion, and therefore, it is possible to obtain an image signal having a uniform appearance.

Also, by reducing the image signal by a variable reduction ratio in the preprocessing for calculating the first correction coefficients, it is possible to speed up the processing.

The embodiment described above was illustrated with an example in which the grayscale conversion is assumed to be space-variant picture compositing, and the combination of the saturation enhancement and edge enhancement is assumed to be fixed picture compositing; however, it is not limited thereto. Any combination is possible.

In the preprocessing, it is possible to perform the same processing as described above on the original image signal without providing the image-signal reduction unit 110.

In the embodiment described above, the processing is assumed to be hardware-based, but it is not necessarily limited to such a configuration. For example, it is also possible to use a configuration in which the unprocessed signal from the CCD 101 is used as Raw data, and information obtained at image-acquisition time from the control unit 106 is output as header information and processed by separate software.

Figure 11:
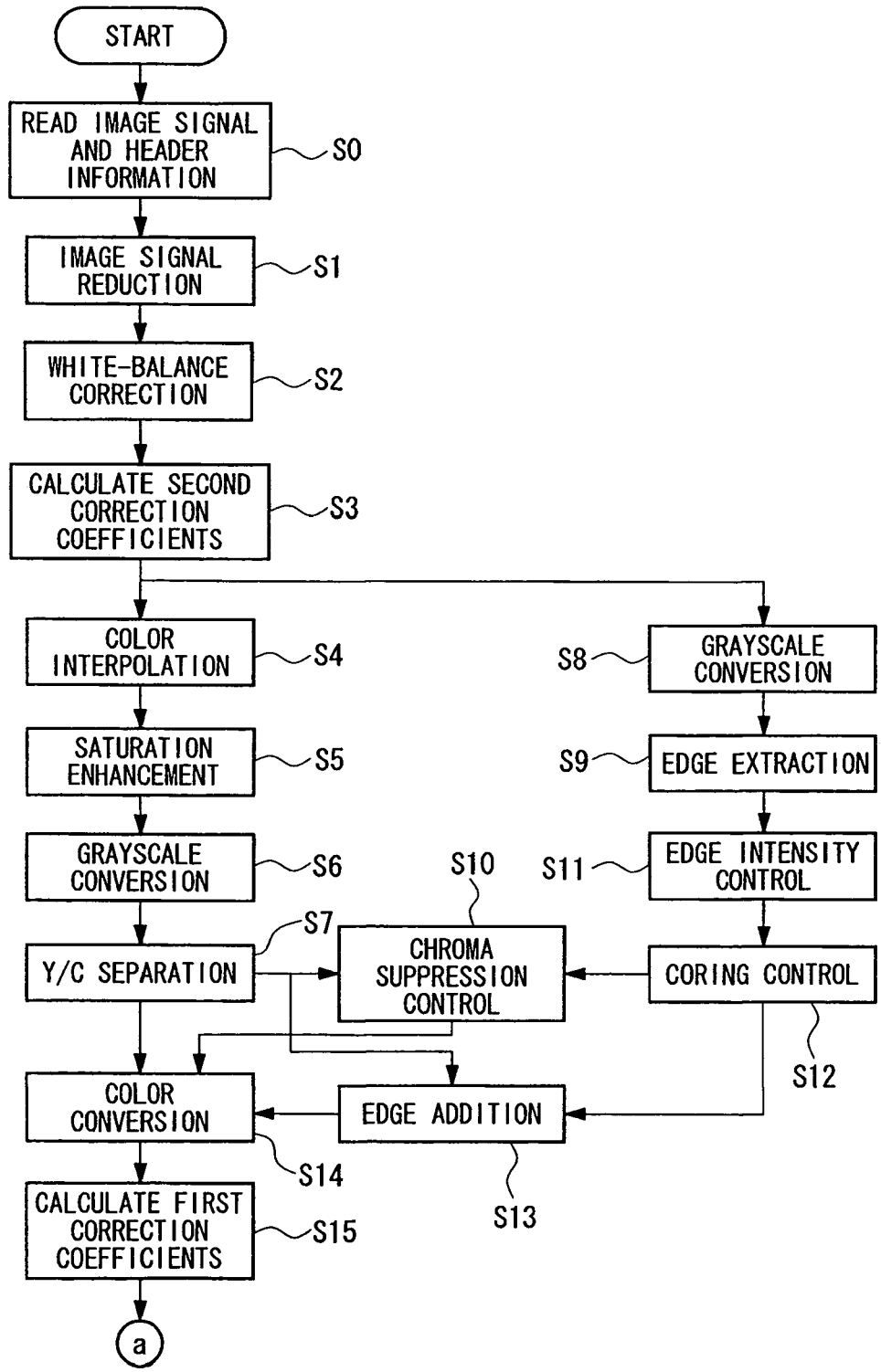
FIG. 11 is a flowchart showing the procedure in preprocessing and main processing, related to software picture compositing in the first embodiment of the present invention.
Figure 12:
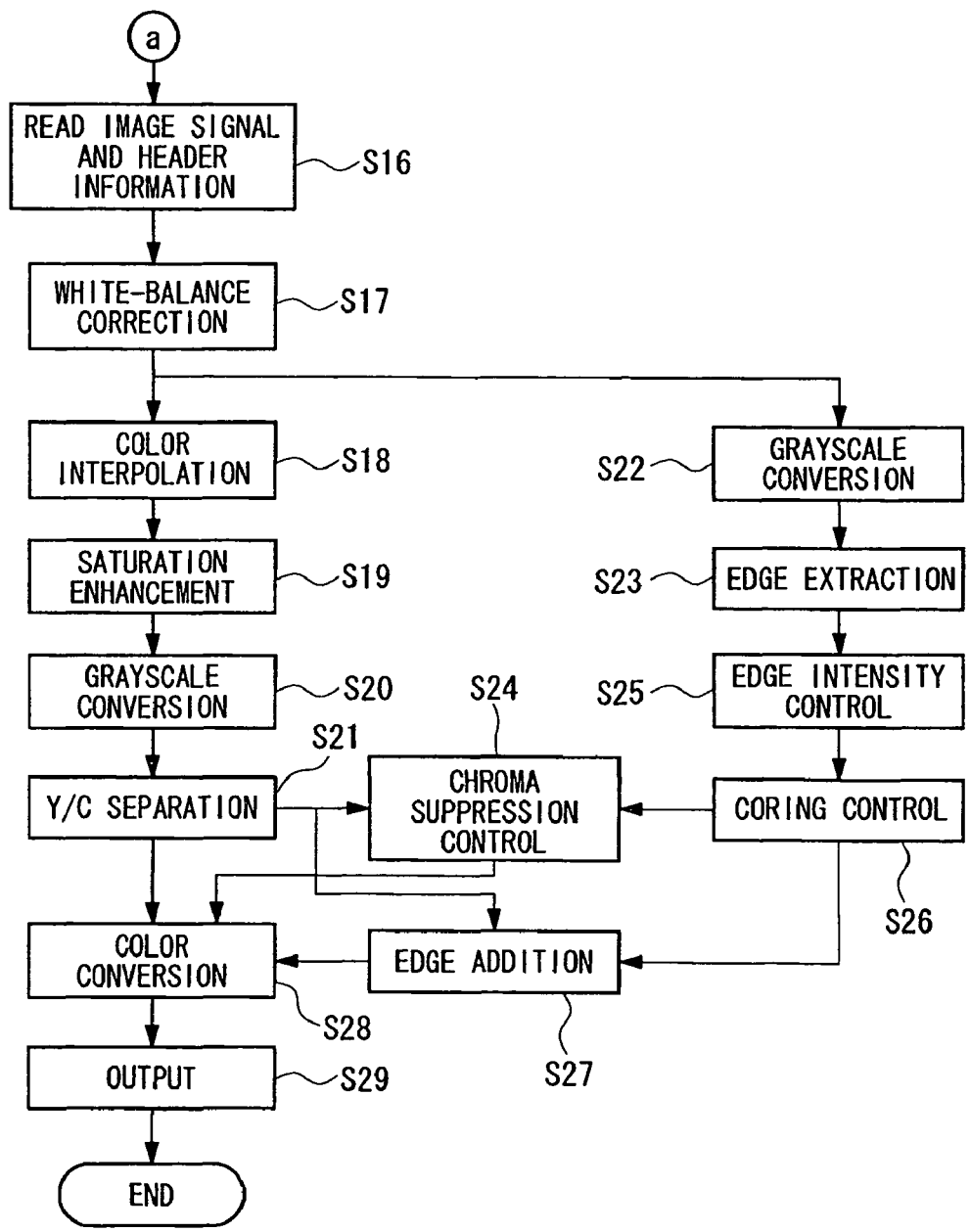
FIG. 12 is a flowchart showing the procedure in the preprocessing and main processing, related to software picture compositing in the first embodiment of the present invention.

FIGS. 11 and 12 are flowcharts showing the procedure in the preprocessing and the main processing related to software picture compositing in the first embodiment of the present invention. The picture compositing according to this embodiment will be described below with reference to FIGS. 11 and 12. The above-described processing executed in each structure shown in FIG. 1 is performed in each processing step described below.

First, the original image signal and header information containing image-acquisition information is read out in Step S0. Image reduction processing by a specified reduction ratio is performed on the original image signal in Step S1. Then, known white-balance correction is performed in Step S2. In Step S3, the second correction coefficients $g2_{ij}$ for performing space-variant grayscale conversion on the reduced image signal are calculated, and these second correction coefficients $g2_{ij}$ are stored.

Known color interpolation is performed in Step S4. In Step S5, saturation enhancement is performed using a fixed correction coefficient according to Equation (2) or Equation (6) above. Then, in Step S6, grayscale conversion is performed at each pixel or each region using the second correction coefficients $g2_{ij}$ calculated in Step S3 above. Y/C separation (luminance signal Y_low and color-difference signals Cr, Cb) is performed in Step S7. In Step S8, only the G signal is extracted from the image signal in Step S2, and grayscale conversion is performed for each pixel or each region using the second correction coefficients $g2_{ij}$ calculated in Step S3 above.

In Step S9, known edge extraction is performed. In Step S10, chroma suppression is performed on the color difference signal CrCb from Step S7 above on the basis of a fixed correction coefficients to suppress false color at the edges according to Equation (14) above. In Step S11, the edge intensity is controlled using the fixed correction coefficients. In Step S12, coring processing is performed according to Equation (11) above using the fixed correction coefficients, and the edge intensity is corrected according to Equation (12) above. In Step S13, known edge-adding processing is performed using the luminance signal Y_low from Step S7 above and the edge intensity from Step S12.

In Step S14, known color conversion from the YCrCb color system to the RGB color system is performed. In Step S15, the first correction coefficient is calculated for each pixel or each region according to Equation (20) above, and this first correction coefficient is stored. This processing completes the preprocessing.

Next, in the main processing, first the original image signal and the header information containing the image-acquisition information are read out in Step S16 shown in FIG. 12. In Step S17, known white-balance correction is performed on the original image signal. In Step S18, known color-interpolation is further performed. In Step S19, saturation enhancement is performed according to Equation (4) or Equation (8) on the basis of the first correction coefficients $g1_{ij}$ calculated in the preprocessing. In Step S20, the second correction coefficients $g2_{IJ}$ corresponding to the original image signal are calculated by performing interpolation on the second correction coefficients $g2_{ij}$ calculated in the preprocessing, and grayscale conversion is performed at each pixel or each region on the basis of the interpolation-processed second correction coefficients $g2_{IJ}$.

Y/C separation (luminance signal Y_low, and color difference signals Cr, Cb) is performed in Step S21. In Step S22, the second correction coefficients $g2_{IJ}$ corresponding to the original image signal are calculated by performing interpolation on the second correction coefficients $g2_{ij}$ calculated in the preprocessing. Then, only the G signal is extracted from the image signal subjected to white-balance correction in Step S17 above, and grayscale conversion is performed at each pixel or each region in this G signal using the interpolation-processed second correction coefficients $g2_{IJ}$.

In Step S23, known edge extraction is performed. In Step S24, chroma suppression is performed on the color-difference signals Cr and Cb obtained in Step S21 above, according to Equation (19) above, using the first correction coefficients $g1_{IJ}$, to suppress false color at the edges. In Step S25, the edge intensity is controlled using the first correction coefficients $g1_{IJ}$. In Step S26, coring is performed according to Equation (18) above, using the first correction coefficients, and then the edge intensity is corrected according to Equation (19). In Step S27, known edge-addition is performed using the luminance signal Y_low obtained in Step S21 and the edge intensity corrected in Step S26. In Step S28, known color conversion from the YCrCb color system to the RGB color system is performed. Known output processing is performed in Step S29, for example, storing the image signal in a memory card or the like, which completes the main processing.

Second Embodiment

Next, an image-signal processing apparatus according to a second embodiment of the present invention will be described with reference to the drawings.

The second embodiment is basically the same as the first embodiment, but the difference is that, in the first embodiment, the second correction coefficients $g2_{ij}$ related to known space-variant grayscale conversion are calculated in the preprocessing, and the first correction coefficients are calculated on the basis of these second correction coefficients $g2_{ij}$, whereas in the second embodiment, second correction coefficients $K_L$ related to space-variant saturation enhancement are calculated in the preprocessing, and the first correction coefficients $g1_{IJ}$ are calculated on the basis of the second correction coefficients $K_L$ related to saturation enhancement.

For the image-signal processing apparatus according to this embodiment, a description of aspects that are the same as those in the first embodiment is omitted, and only the differences are described. Components that are identical to those in the first embodiment described above are assigned the same reference numerals, and a detailed description thereof is omitted.

Figure 13:
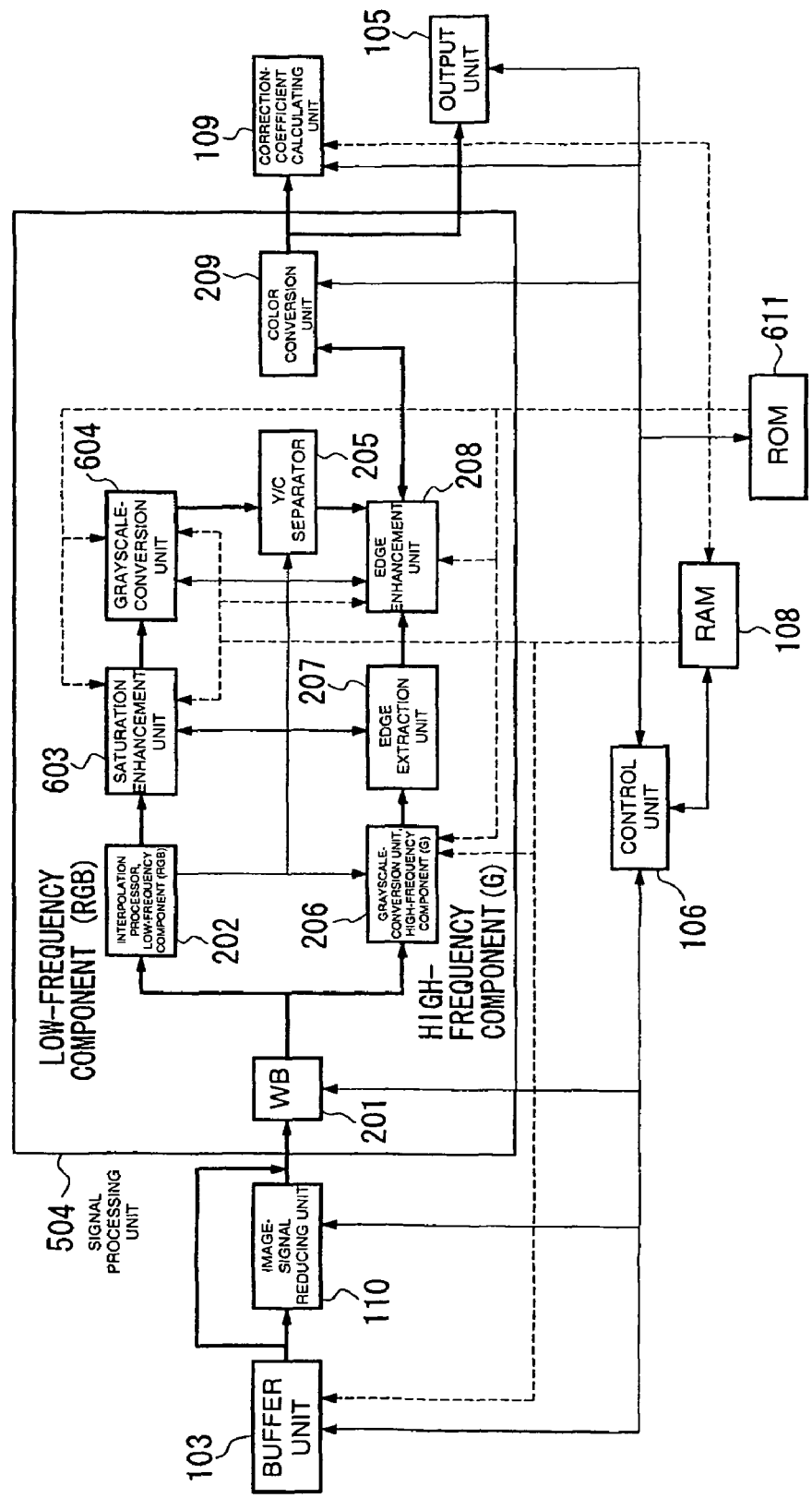
FIG. 13 is a block diagram showing an example configuration of a signal processing unit according to a second embodiment of the present invention.

FIG. 13 is a block diagram showing an example configuration of a signal processing unit 504 according to this embodiment. As shown in this figure, the signal processing unit 504 has substantially the same configuration as the signal processing unit 104 according to the first embodiment shown in FIG. 2, but differs in the following aspects: the second-correction-coefficient calculating unit 210 is not provided, a saturation enhancement unit 603 is provided instead of the saturation enhancement unit 203, a grayscale conversion unit 604 is provided instead of the grayscale conversion unit 204, and a ROM 611 is provided instead of the ROM 111. A hue table for Cr and Cb, a specific region related to a specific hue, and a second correction-coefficient $K_L$ related to that hue are stored in advance in the ROM 611 according to this embodiment.

In the signal processing unit 504 according to this embodiment, in the preprocessing, the WB unit 201 first performs known white-balance correction on the transferred image signal on the basis of a control signal from the control unit 106. The white-balance-corrected image signal is then transferred to the interpolation processor 202 and the grayscale conversion processor 206.

The interpolation processor 202 generates a three-layer image from a single-layer image using known interpolation and transfers it to the saturation enhancement unit 603. The saturation enhancement unit 603 multiplies the RGB signal by a 3×3 matrix for YCrCb conversion on the basis of a control signal from the control unit 106 to convert the RGB signal to a YCrCb signal. Then, a specific hue, such as skin tones or the color of the sky, is detected at each pixel or each region under the control of the control unit 106, and second correction coefficients for the image signal are set.

The processing in the saturation enhancement unit 603 will be described in detail below.

The saturation enhancement unit 603 calculates a hue angle $A_{ij}$ for each pixel or each region on the basis of color-difference signals $Cr_{ij}$ and $Cb_{ij}$ of the YCrCb signal, according to Equation (21) below.

$$A_{ij} = \mathrm{arctg}(Cb_{ij}/Cr_{ij}) \tag{21}$$

In Equation (21) above, arctg is the arctangent function.

Figure 14:
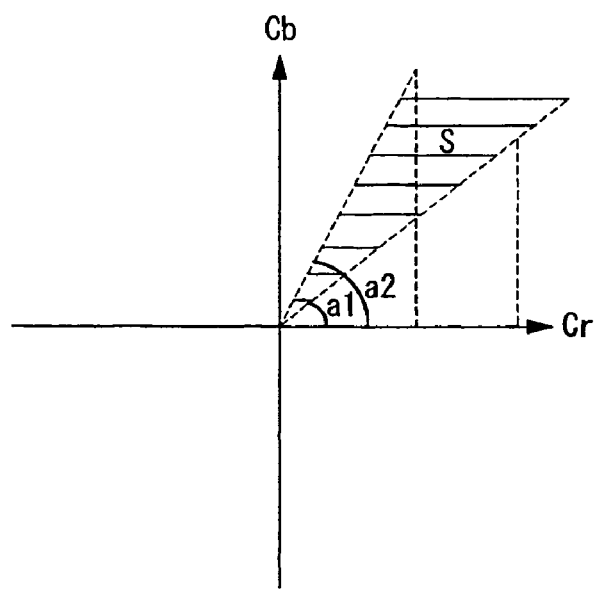
FIG. 14 is a diagram showing an example of a hue chart used when extracting a specific hue.

Next, the saturation enhancement unit 603 compares the calculated $A_{ij}$ with the data in the Cr and Cb hue tables stored in the ROM 611 and determines whether it is the specific hue on the basis of Equation (22) below. For example, as shown in FIG. 14, if the color-difference signals $Cr_{ij}$ and $Cb_{ij}$ for each pixel belong to a region S representing the specific hue in the Cr-Cb plane, it is determined that that pixel has the specific hue.

$$a1 < A_{ij} < a2 \tag{22}$$

In Equation (22) above, a1 and a2 are constants indicating values of the specific region of the specific hue.

The saturation enhancement unit 603 extracts the second correction coefficients $K_L$ related to that hue from the ROM 611 (the subscript L indicates a number for specifying the specific hue stored in the ROM 611), and creates a 3×3 matrix on the basis of the extracted second correction coefficients.

Then, CrCb enhancement is performed by multiplying the YCrCb signal by the created 3×3 matrix. Then, the YCrCb signal subjected to CrCb enhancement is converted to an $R_{ij}'G_{ij}'B_{ij}'$ signal by multiplying the CrCb enhanced YCrCb signal by a 3×3 matrix for RGB conversion. The procedure described above can be represented by Equation (23) below.

$$[R'_{ij} \ G'_{ij} \ B'_{ij}] = [R_{ij} \ G_{ij} \ B_{ij}] * \begin{bmatrix} a11 & a12 & a13 \\ a21 & a22 & a23 \\ a31 & a32 & a33 \end{bmatrix} * \begin{bmatrix} 1 & 0 & 0 \\ 0 & K_1 & 0 \\ 0 & 0 & K_1 \end{bmatrix} * \begin{bmatrix} a'11 & a'12 & a'13 \\ a'21 & a'22 & a'23 \\ a'31 & a'32 & a'33 \end{bmatrix} \quad (23)$$

for YCrCb conversion / for CrCb enhancement / for RGB conversion

In addition, the saturation enhancement unit 603 reads out fixed correction coefficients $K_0$ from the ROM 611 and uses these fixed correction coefficients $K_0$ to performs saturation enhancement on pixels other than those having the specific hue described above using according to Equation (2) above. Then, the saturation enhancement unit 603 performs subtraction on the basis of Equation (24) below using each of the $R_{ij}'$, $G_{ij}'$, and $B_{ij}'$ signals subjected to saturation enhancement on the basis of Equation (23) above and the R', G', and B' signals subjected to saturation enhancement using these fixed correction coefficients $K_0$ to obtain the first correction coefficients $W_{ij}$. Then, the saturation enhancement unit 603 stores the first correction coefficients $W_{ij}$ and the second correction coefficients $K_L$ extracted from the ROM 611 in the RAM 108.

$$W_{ij} = P_{ij} - P'_{ij} \quad (24)$$

In Equation (24) above, $P_{ij}$ are the space-variant saturation-enhanced $R'_{ij}$, $G'_{ij}$, and $B'_{ij}$ calculated in Equation (23); $P'_{ij}$ are the fixed saturation-enhanced R', G', and B' calculated in Equation (2), in other words, saturation-enhanced signals using the fixed correction coefficients $K_0$; and $W_{ij}$ are first correction coefficients corresponding to R, G, and B.

The saturation enhancement unit 603 sets the first correction coefficients $W_{ij}$ to "0 (zero)" for pixels other than those having the specific hue and stores them in the RAM 108.

In the main processing on the other hand, with the same units as in the preprocessing described above, the saturation enhancement unit 603 detects the specific hue, such as skin tones or the color of the sky, at each pixel or each region, reads out the second correction coefficients $K_1$ from the RAM 108, and performs saturation enhancement on pixels having the specific hue using Equation (21) above. In contrast, for pixels other than those having the specific hue, the fixed correction coefficients $K_0$ are read out from the ROM 611, and saturation enhancement is performed using these fixed correction coefficients $K_0$, according to Equation (2) above.

The grayscale conversion unit 604 performs grayscale conversion on the basis of a γ-characteristic.

In the preprocessing, the grayscale conversion unit 604 directly transfers the input signal to the Y/C separator 205 without performing grayscale conversion. In the main processing on the other hand, the grayscale conversion unit 604 first extracts the first correction coefficients $W_{ij}$ from the RAM 108 under the control of the control unit 106 and obtains the first correction coefficients $W_{IJ}$ corresponding to the original image signal by interpolation.

Next, the grayscale conversion unit 604 converts the 12-bit RGB data to 10-bit RGB data at pixels other than those having the specific hue using the interpolated first correction coefficients $W_{IJ}$. Because the first correction coefficients $W_{IJ}$ associated with pixels other than those having the specific hue are set to "0 (zero)", grayscale conversion is performed on the basis of Equation (25) below.

$$M_{IJ} = \text{Tone}(P_{IJ}) \quad (25)$$

In Equation (25) above, $P_{IJ}$ are R, G, and B, and $M_{IJ}$ indicates the grayscale-converted R, G, and B.

Next, the grayscale conversion unit 604 converts the 12-bit RGB data to 10 bits at the pixels having the specific hue using the interpolated first correction coefficients $W_{IJ}$, according to Equation (26) below.

$$M_{IJ} = \text{Tone}(P_{IJ} - W_{IJ}) + W_{IJ} * 1024/4096 \quad (26)$$

In Equation (26) above, $P_{IJ}$ is R, G, and B after saturation enhancement, and $M_{IJ}$ indicates R, G, and B after grayscale conversion.

When the grayscale conversion unit 604 performs grayscale conversion in this way, the grayscale-converted signals are transferred to the Y/C separator 604.

Figure 15:
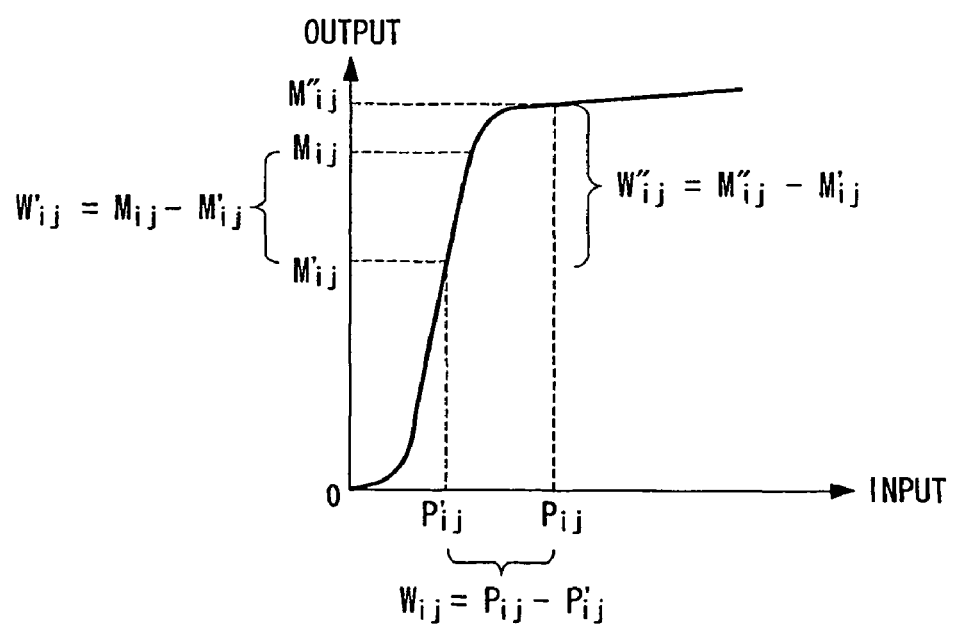
FIG. 15 is a diagram showing an example of a γ-characteristic for grayscale conversion according to the second embodiment of the present invention.

FIG. 15 shows the γ-characteristic for the grayscale conversion. In this figure, $P_{IJ}$ indicates input values when space-variant saturation enhancement is performed on the basis of the second correction coefficients $K_L$, and $M''_{IJ}$ indicates the output values when the input values $P_{IJ}$ are subjected to grayscale conversion. $P'_{IJ}$ indicates the input values when the fixed saturation enhancement is performed on the basis of the fixed correction coefficients $K_0$, and $M'_{IJ}$ indicates the output values when the input values $P'_{IJ}$ are subjected to the grayscale conversion.

The difference between the input values $P_{IJ}$ and $P'_{IJ}$ is $W_{IJ}$, but after grayscale conversion, the difference between the corresponding output values $M''_{IJ}$ and $M'_{IJ}$ is $W''_{IJ}$ ($W''_{IJ}/1024 > W_{IJ}/4096$).

As can be understood from FIG. 15, for the pixel values subjected to the space-variant saturation enhancement, the difference relative to the pixel values subjected to the fixed saturation enhancement is larger, and there is a possibility of eliminating the appearance of uniformity and balance in the image quality.

Therefore, with the image-signal processing apparatus according to this embodiment, it is possible to prevent a large difference from occurring by performing grayscale conversion on the pixels subjected to space-variant saturation-enhancement on the basis of the first correction coefficients $W_{IJ}$, according to Equation (26) above. As a result, it is possible to obtain a high-quality image with a uniform and balanced appearance.

With the image-signal processing apparatus according to this embodiment, it is possible to easily create an image which has a uniform appearance in terms of pixels of specific colors.

In the Embodiment described above, the processing is assumed to be hardware-based, but it is not necessarily limited to this configuration. For example, it is also possible to use a configuration in which the signal from the CCD 101 is used as Raw data, and information obtained from the control unit 106 at image-acquisition time is output as header information and processed in separate software.

Figure 16:
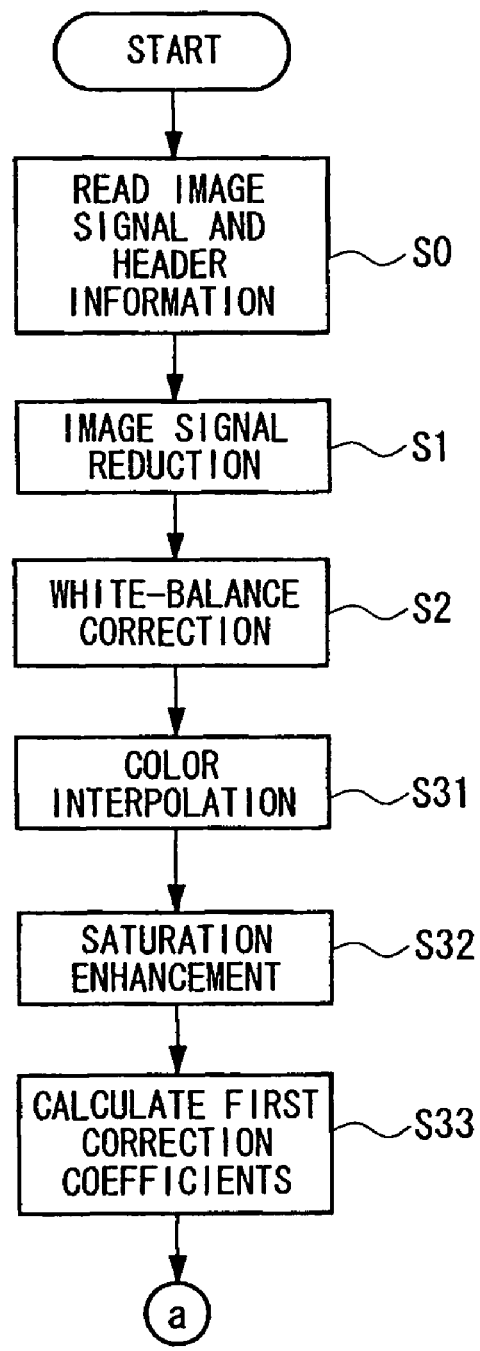
FIG. 16 is a flowchart showing the procedure in the preprocessing and main processing, related to software picture compositing in the second embodiment of the present invention.
Figure 17:
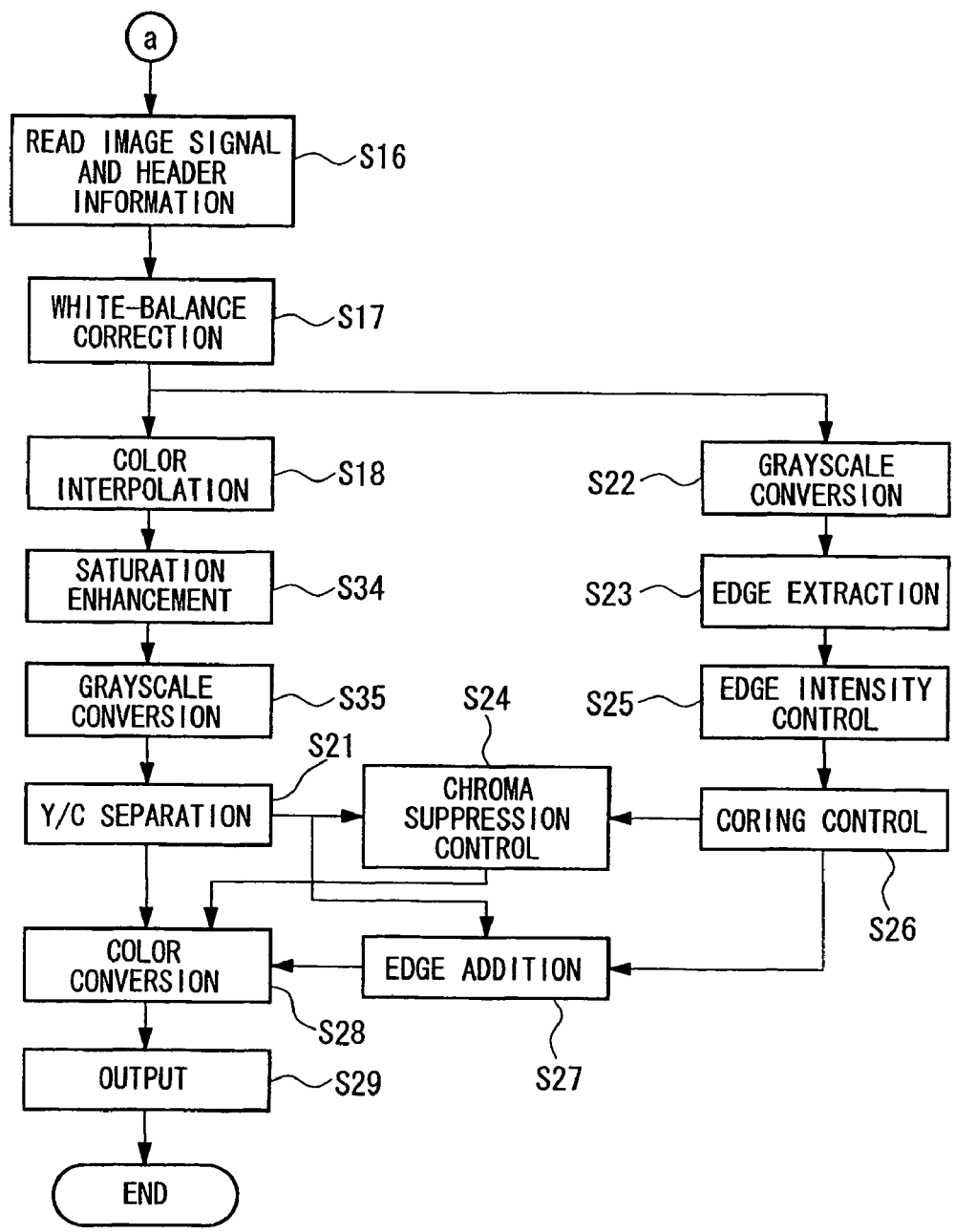
FIG. 17 is a flowchart showing the procedure in preprocessing and main processing, related to software picture compositing in the second embodiment of the present invention.

FIGS. 16 and 17 are flowcharts showing the procedures in the preprocessing and main processing related to picture-compositing software processing in the second embodiment of the present invention. The picture compositing in this embodiment will be described below with reference to FIGS. 16 and 17. Processes in FIGS. 16 and 17 which are the same as those in FIGS. 11 and 12 are assigned the same step numbers, and a description thereof is omitted. The above-described processing executed in each structure shown in FIG. 1 is performed in each processing step described below.

After performing Steps S0 to S2, known color-interpolation is performed in Step S3. Then, in Step S31, saturation enhancement is performed using the second correction coefficients $K_L$ on the basis of Equation (23) above. In Step S5, the first correction coefficients $W_{ij}$ are calculated for each pixel or each region as shown in Equation (24) above, which completes the preprocessing.

Next, in the main processing, after performing Steps S16 to S18, saturation enhancement is performed in Step S34 using the second correction coefficients $K_L$ on the basis of Equation (23) above. Then, in Step S35, the first correction coefficients $W_{IJ}$ corresponding to the original image signal are created by interpolating the first correction coefficients $W_{IJ}$ calculated in Step S33 in the preprocessing, and grayscale conversion is performed for each pixel or each region using the interpolated first correction coefficients $W_{IJ}$ on the basis of Equation (26) above. Then, steps S21 to S29 are performed, and the main processing ends.

Third Embodiment

Next, an image-signal processing apparatus according to a third embodiment of the present invention will be described with reference to the drawings.

Figure 18:
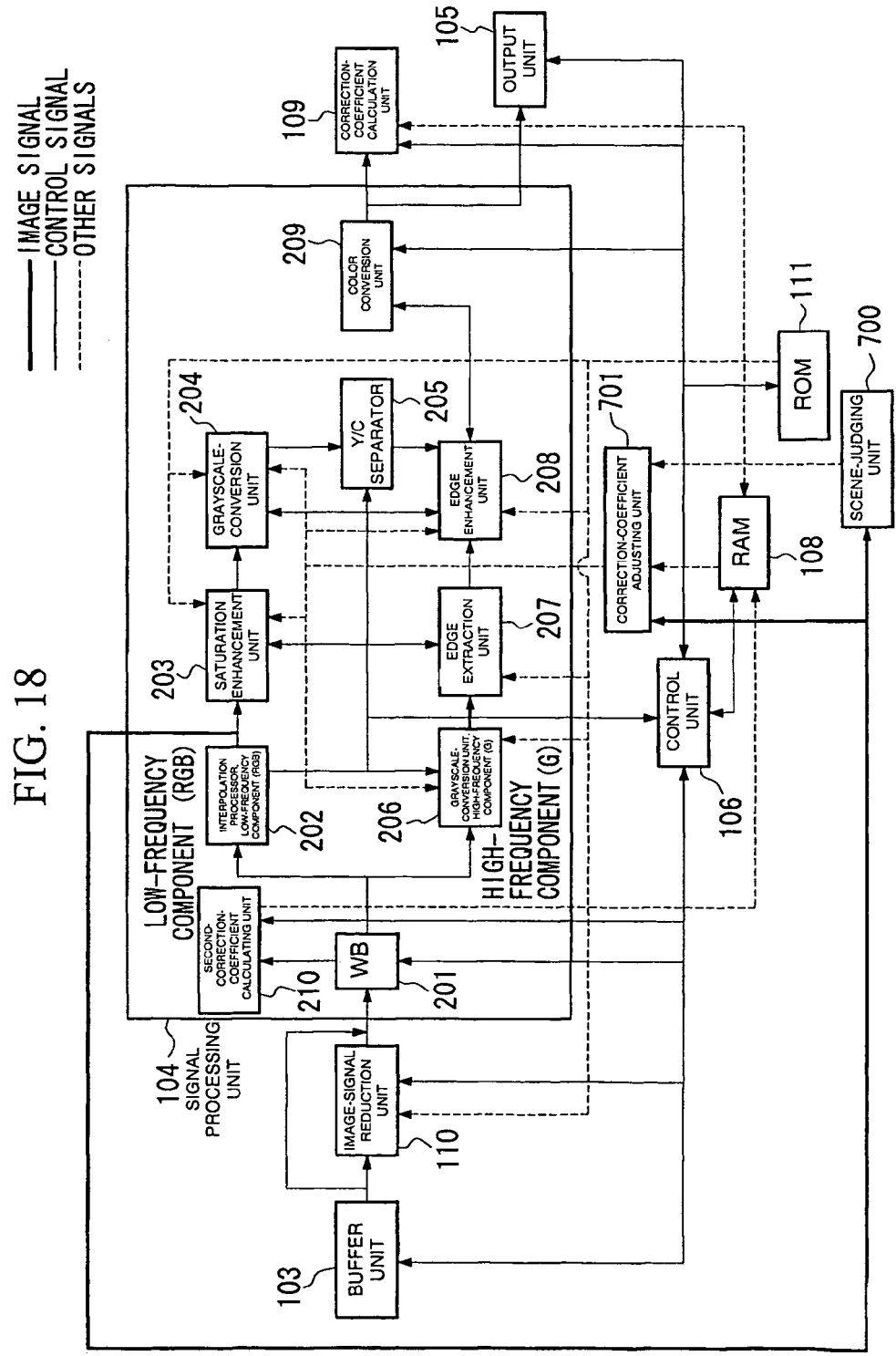
FIG. 18 is a block diagram showing, in outline, the configuration of a signal processing unit in an image-signal processing apparatus according to a third embodiment of the present invention, and the vicinity thereof.

The third embodiment is basically the same as the first embodiment, but it differs in that, in addition to the components of the image-signal processing apparatus according to the first embodiment shown in FIG. 2, it includes a scene-judging unit 700 and a correction-coefficient adjusting unit 701, as shown in FIG. 18.

For the image-signal processing apparatus according to this embodiment, a description of features that are common to the first embodiment will be omitted, and only the differences will be described.

FIG. 18 is a block diagram showing, in outline, the configuration of a signal processing unit in the image-signal processing apparatus according to this embodiment, and the vicinity thereof.

The scene-judging unit 700 added to this embodiment is activated in the preprocessing to judges whether or not the original image signal is an image signal obtained by acquiring a prescribed scene or a prescribed subject. First, the output signal from the interpolation processor 202 is transferred to the scene-judging unit 700. The scene-judging unit 700 detects, from that signal, pixels having a saturation and hue corresponding to skin tone colors, green, and sky-blue, and counts the numbers thereof as $C_1$, $C_2$, and $C_3$. Then, from the total number of pixels N and the counts $C_1$, $C_2$, and $C_3$, it calculates indexes $A_1$, $A_2$, and $A_3$ indicating the degree of importance of the skin tone colors, green, and sky blue in the current scene using equation (27) below (n is an integer from 1 to 3 corresponding to skin tone colors, green, and sky blue, in this order).

$$A_n = f_n(C_n/N) \quad (27)$$

Figure 19:
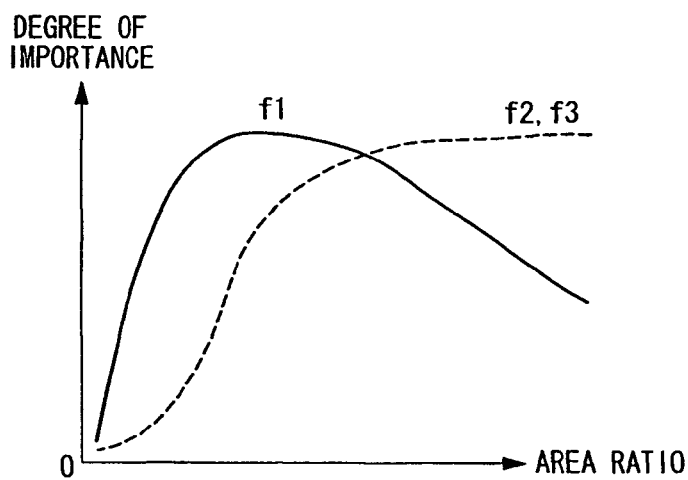
FIG. 19 is a diagram showing examples of a function f.

In Equation (27) above, $f_n$ is a function correlating the area ratio that each color occupies in the scene and the degree of importance of that color. Taking skin tone colors as an example, as shown in FIG. 19, they are judged to be important even though their area is small, and they are judged to be relatively unimportant when their area is large ($f_1$). For green and sky-blue on the other hand, the correlations are such that they are determined to be more important as their areas increase ($f_2$, $f_3$). After calculating $A_1$, $A_2$, and $A_3$ described above, the scene-judging unit 700 transfers them to the correction-coefficient adjusting unit 701. In this embodiment, the scene-judging unit 700 decides whether the original image signal is obtained by image acquisition of a prescribed scene or a prescribed subject by calculating $A_1$, $A_2$, and $A_3$.

The correction-coefficient adjusting unit 701 operates in the main processing when there is a request to read out correction coefficients from the saturation enhancement unit 203 and the grayscale conversion unit 204 to the RAM 108, and changes the processing performed in the signal processing unit 104. In this embodiment, the processing performed in the signal processing unit 104 is changed according to $A_1$, $A_2$, and $A_3$ mentioned above, which are transferred from the scene-judging unit 700. Specifically, the correction-coefficient adjusting unit 701 receives color-interpolated values (R, G, B) from the interpolation processor 202 for current pixels to be processed in response to a readout request and estimates a degree $D_n$ to which the pixels to be processed belong to a specific subject using Equation (28) below. $D_1$ corresponds to the degree to which pixels to be processed belong to skin tone colors, $D_2$ the degree to which pixels to be processed belong to green, and $D_3$ the degree to which pixels to be processed belong to sky-blue.

$$D_n = \alpha_n * |Y - Y_n| + \beta_n * |S - S_n| + \gamma_n * |H - H_n|$$

$$H = \text{atan}((R-Y)/(B-Y))$$

$$S = \text{sqrt}((R-Y)^2 + (B-Y)^2) \quad (28)$$

Here, Y, H, and S are respectively the luminance, hue, and saturation of the pixels to be processed, atan is the arctangent function, and sqrt is the square-root function. $\alpha_n$, $\beta_n$, and $\gamma_n$ are constants which change according to n, and $Y_n$, $H_n$, and $S_n$ are constants representing the luminance, hue, and saturation of the representative colors skin tone, green, and sky blue, in this order from n=1 to 3. These constants are stored in the correction-coefficient adjusting unit 701.

The signal processing unit 104 adjusts the correction coefficients for the pixels to be processed on the basis of $D_1$, $D_2$, and $D_3$ and performs subsequent processing using the adjusted correction coefficients, thus changing the processing performed in the signal processing unit 104. Adjustment of the correction coefficients for the pixels to be processed is performed, for example, on the basis of Equation (29) below.

$$r_n = A_n * D_n$$

$$P_n' = r_n * x_n(Ps) + (1 - r_n) * P$$

$$Q_n' = r_n * y_n(Qs) + (1-r_n) * Q$$

$$P' = (P_1' + P_2' + P_3')/3,$$

$$Q' = (Q_1' + Q_2' + Q_3')/3 \quad (29)$$

Figure 20:
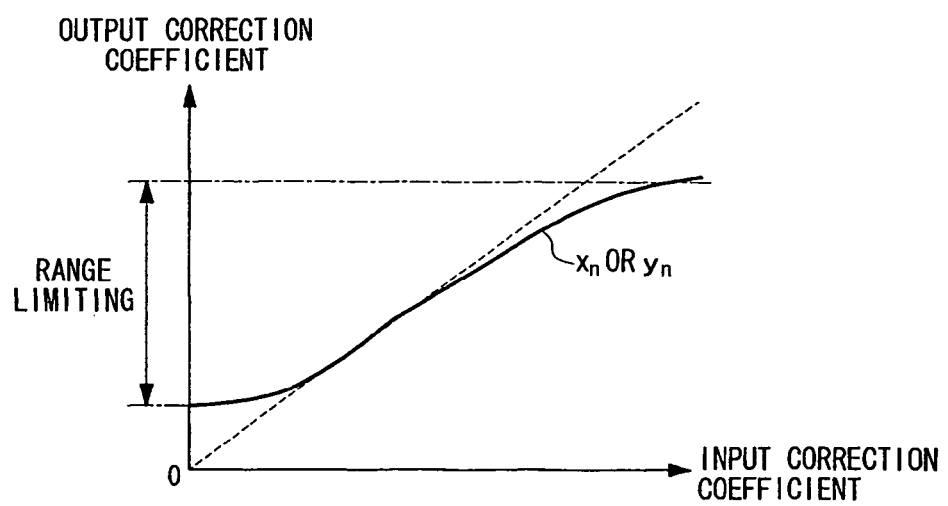
FIG. 20 is a diagram showing an example of functions g and h.

In Equation (29) above, n is an integer from 1 to 3. $r_n$ is an index indicating whether the pixel to be processed in the present scene is important. $A_n$ is a degree of importance in the present scene for the skin tone, green, and sky blue colors, calculated by the scene-judging unit 700 in the preprocessing. $D_n$ is a value representing the degree to which the pixels to be processed belong to each specific color. Q is a first correction coefficient, P is a second correction coefficient, Qs is a value obtained by smoothing the first correction coefficients in the vicinity of the pixel to be processed, Ps is a value obtained by smoothing the second correction coefficients in the vicinity of the pixel to be processed, Q' is an adjusted first correction coefficient, and P' is an adjusted second correction coefficient. Also, $x_n()$ and $y_n()$ are functions for limiting the range; limiting the range enables adjustment of the final colors of the pixels to be processed after performing the processing in the saturation enhancement unit 203 and the grayscale conversion processing 204. An example of range limiting is shown in FIG. 20.

With this range limiting, it is possible to indirectly adjust the final colors of the pixels to be processed after performing processing in the saturation enhancement unit 203 and the grayscale conversion unit 204 described above. For example, manually setting a concrete upper limit and lower limit for the range limiting in advance using procedures a), b), and c) below and using the results in the processing in the saturation enhancement unit 203 and the grayscale conversion unit 204 produces desirable processing results in the saturation enhancement unit 203 and the grayscale conversion unit 204.

a) RGB signal samples showing representative skin tone colors are prepared. For these samples, the differences in their luminance, hue, and saturation relative to the luminance, hue, and saturation of representative skin tone colors set in the correction-coefficient adjusting unit 701 are within a prescribed level.

b) For the RGB signal after processing in the saturation enhancement unit 203 and the grayscale conversion unit 204, the range of the RGB signal is defined to make the RGB signal a subjectively preferred skin tone color. This range can be set in advance by subjective evaluation tests or the like.

c) Equations (3), (4) and (9-2) calculated in the main processing in the saturation enhancement unit 203 and the grayscale conversion unit 204 are applied to the RGB signals of the samples prepared in a). At that time, by varying the first and second correction coefficients used in Equations (3) and (9-2) and examining whether the processing results at each stage deviate from the range set in b), the required upper and lower limits for the first and second correction coefficients are set to produce desirable processing results in the saturation enhancement unit 203 and the grayscale conversion unit 204.

Once the upper and lower limits of the first and second correction coefficients are set in advance with the procedure shown by a), b), and c) above, these upper and lower limit values are set as the upper and lower limits of the functions $x_n()$ an $y_n()$ in Equation (29) and are used in the processing in the saturation enhancement unit 203 and the grayscale conversion unit 204 described above.

Ps and Qs in Equation (29) are not limited to values obtained by smoothing each correction coefficient in the vicinity of the pixel to be processed; their spatial frequency range may be arbitrarily corrected, such as by emphasizing the high-frequency range of each correction coefficient.

The correction-coefficient adjusting unit 701 judges whether or not the pixel to be processed is important on the basis of $r_n$ described above; if the pixel to be processed is important, it makes the spatial variation of the correction coefficients more gentle and limits the range thereof by modifying the functions $x_n()$ and $y_n()$ described above. As shown in FIG. 20, the correction coefficient that are output in response to the input correction coefficients are characterized in that their range is limited. It is also possible to correct just one correction coefficient, either the first correction coefficient Q or the second correction coefficient P.

As described above, with the image-signal processing apparatus according to this embodiment, either both the first correction coefficients and the second correction coefficients or just one of the first and second correction coefficients is adjusted according to the scene and the degree of importance of the pixel to be processed. Therefore, it is possible to realize saturation enhancement and grayscale conversion using the optimum correction coefficients for each scene. Accordingly, it is possible to obtain superior image quality.

In the Embodiment described above, it is assumed that the processing is hardware-based; however, it is not necessarily limited to this configuration. For example, it is also possible to use a configuration in which the unprocessed signal from the CCD 101 is used as Raw data, and information obtained from the control unit 106 at image acquisition time is output as header information and processed by separate software.

Figure 21:
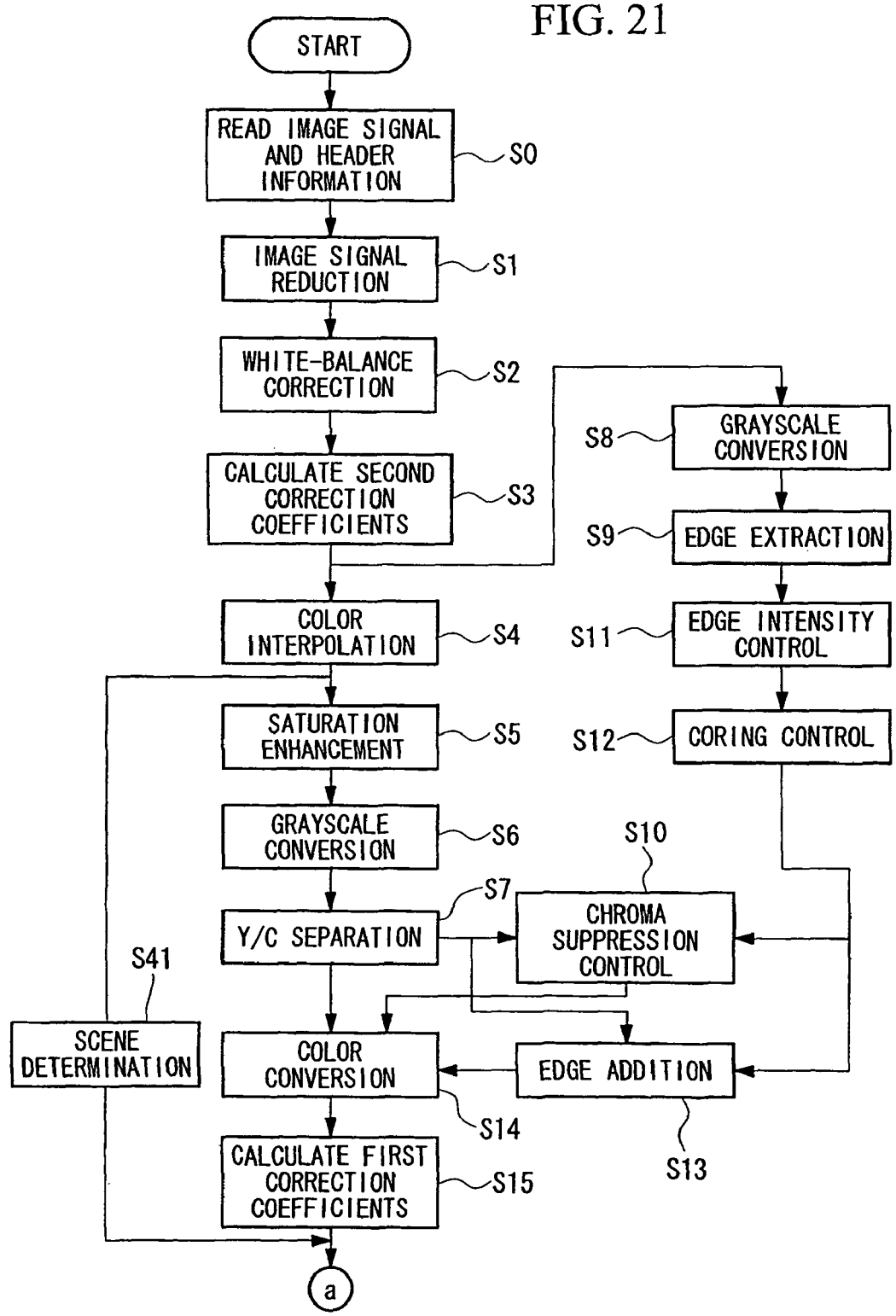
FIG. 21 is a flowchart showing the procedure in preprocessing and main processing, related to software picture compositing in the third embodiment of the present invention.
Figure 22:
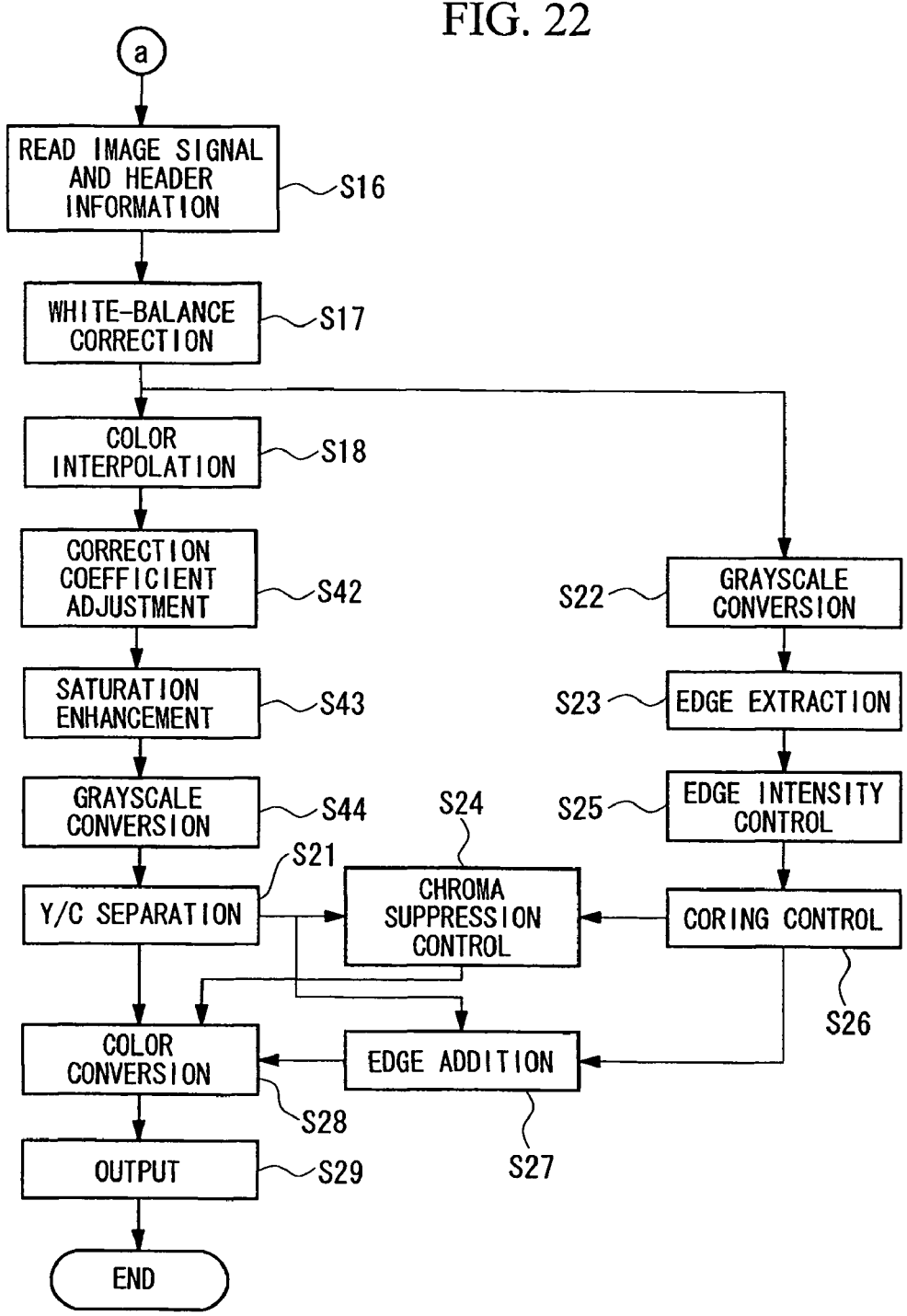
FIG. 22 is a flowchart showing the procedure in the preprocessing and main processing, related to software picture compositing in the third embodiment of the present invention.

FIGS. 21 and 22 are flowcharts showing the procedure in the preprocessing and the main processing, related to software picture compositing in the third embodiment of the present invention. In the processing procedure according to this embodiment, in the preprocessing, scene estimation in Step S41 is added to the flowchart shown in FIG. 11, and correction-coefficient adjustment in Step S42 is added in the main processing. Instead of Steps S19 and S20 in FIG. 12, Steps S42 and S43 are employed. In the following, the processes in FIGS. 21 and 22 that are the same as those in FIGS. 11 and 12 are assigned the same step numbers, and a description thereof is omitted; only steps that have been changed or added are described.

First, after performing the processing in Steps S0 to S3, in parallel with the processing in Steps S5 to S15, in Step S41, scene judgment is performed on the data subjected to color interpolation in Step S4 above, the indexes $A_1$, $A_2$, and $A_3$ described above are calculated, and the preprocessing ends.

Next, in the main processing, the processing in Steps S16 to S18 is performed, and then in Step S42, correction-coefficient adjustment is performed. In this correction-coefficient adjustment, second correction coefficients for the image signal from the image-acquisition device are first obtained by performing interpolation on the second correction coefficients calculated for the reduced image, and after the interpolation processing, the second correction coefficients are stored in a buffer in the memory.

Then, in Step S18, the first correction coefficients calculated in Step S15 and the interpolated second correction coefficients are adjusted on the basis of the color-interpolated image data and the indexes $A_1$, $A_2$, and $A_3$ calculated in S41, and these adjusted correction coefficients are stored in a buffer in the memory. Next, in Step S43, saturation enhancement is performed using the correction coefficients adjusted in Step S42 above, then in Step S44, grayscale conversion is performed using the correction coefficients adjusted in Step S42, and Steps S21 to S29 are executed, whereupon the main processing ends.

Fourth Embodiment

Next, an image-signal processing apparatus according to a fourth embodiment of the present invention will be described with reference to the drawings.

The fourth embodiment has substantially the same configuration as the image-signal processing apparatus according to the third embodiment described above. However, it differs in that, instead of the correction-coefficient adjusting unit 701 shown in FIG. 18, a table changing unit 801 is provided as an enhancement-coefficient setting unit, and a ROM 811 is provided instead of the ROM 111.

For the image-signal processing apparatus according to this embodiment, a description of the features common to the third embodiment is omitted below, and only the differences are described.

Figure 23:
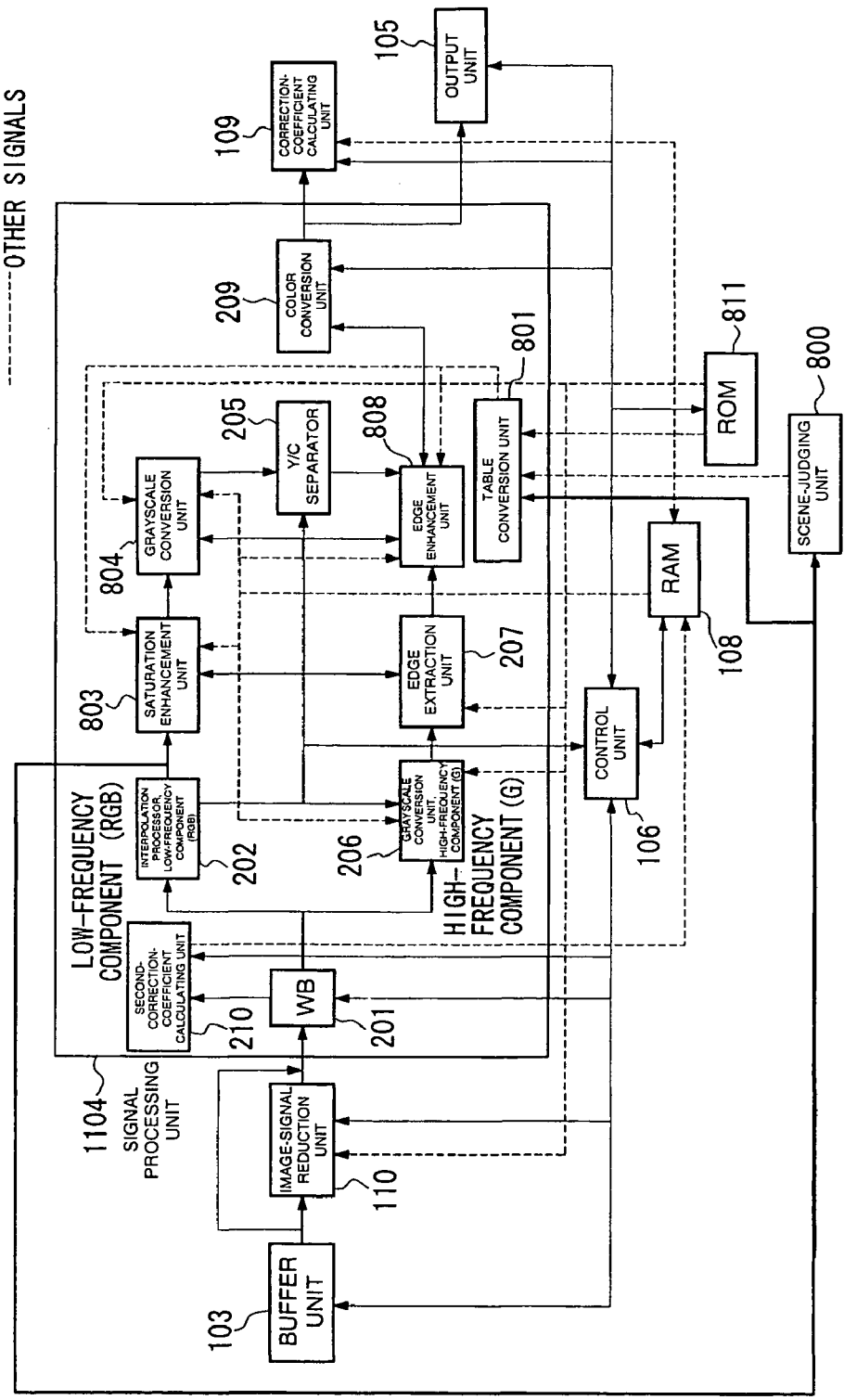
FIG. 23 is a block diagram showing, in outline, the configuration of a signal processing unit in an image-signal processing apparatus according to a fourth embodiment of the present invention, and the vicinity thereof.

FIG. 23 is a block diagram showing, in outline, the configuration of the image-signal processing apparatus according to this embodiment.

In this embodiment, the ROM 811, which is different from the ROM 111, stores a data table containing a function color( ) to be used in saturation enhancement (see FIG. 3) and a function edge_gain( ) to be used in edge enhancement (see FIG. 7). The saturation enhancement unit 803 and the edge enhancement unit 808, which use these functions, are connected to the ROM 811 via the table changing unit 801. When the enhancement coefficients using these functions (that is, the saturation-enhancement coefficients $K_{IJ}$ and the enhancement gain $Eg_{IJ}$) are needed by the saturation enhancement unit 803 and the edge enhancement unit 808, the table changing unit 801 reads out the tabulated data from the ROM 811 and arbitrarily changes it, then calculates the enhancement coefficients and outputs them to the saturation enhancement unit 802 and the edge enhancement unit 808. The way in which these changes are performed depends on the judgment result of the scene-judging unit 800.

The scene-judging unit 800 operates in the preprocessing, in the same way as in the third embodiment described above, to judge whether the original image signal is an image signal obtained by acquiring a prescribed scene or a prescribed subject. When the processed image data is output from the interpolation processor 202, the scene-judging unit 800 detects pixels having a saturation and hue corresponding to skin tone colors and counts the number $C_1$ thereof. Also, the luminance of each pixel is calculated and the number of pixels, $C_2$, judged as being dark regions with luminances equal to or less than a prescribed threshold is counted. Then, from the total number of pixels N and the counts $C_1$ and $C_2$, indexes $A_1$ and $A_2$ indicating a required level of attention for the skin tone colors and dark regions in the current scene are calculated using Equation (30) below (where n is an integer from 1 to 2, corresponding to skin tone colors and dark regions in this order).

$$A_n = f_n(C_n/N) \quad (30)$$

In Equation (30) above, $f_n$ is a function relating area ratios occupied by the skin tone colors and dark regions in the scene and the degrees of attention to be given to those colors; for example, it has the same characteristics as FIG. 19 which shows the outline configuration of the image-signal processing apparatus according to the third embodiment. After calculating $A_1$ and $A_2$, the scene-judging unit 800 transfers them to the table changing unit 801. In this embodiment, the scene-judging unit 800 judges whether the original image signal is obtained by acquiring a prescribed scene or a prescribed subject by calculating $A_1$ and $A_2$.

In the main processing on the other hand, the saturation enhancement unit 803 outputs the first correction coefficients $g1_{IJ}$ and a luminance value Y of the pixel to be processed to the table changing unit 801, and requests the table changing unit 801 to calculate the saturation-enhancement coefficients $K_{IJ}$ obtained from Equation (3) in the first embodiment described above. Apart from this aspect, the operation of the saturation enhancement unit 803 is the same as that of the saturation enhancement unit 203 in the first embodiment described above.

The table changing unit 801 changes the processing performed in the signal processing unit 1104. In this embodiment, the processing performed in the signal processing unit 1104 is changed according to $A_1$ and $A_2$ transferred from the scene-judging unit 800. More specifically, the table changing unit 801 receives color-interpolated values (R, G, B) for the pixel to be processed from the interpolation processor 202 and estimates a degree $D_1$ to which the pixel to be processed belongs to the skin tone colors using the same method as that performed by the correction-coefficient adjusting unit 701 in the third embodiment (see Equation (28)).

Then, the table changing unit 801 estimates a degree $D_2$ to which the pixel to be processed belongs to a dark region using Equation (31) below.

$$D_2 = s(Y/Y_0) \quad (31)$$

Figure 24:
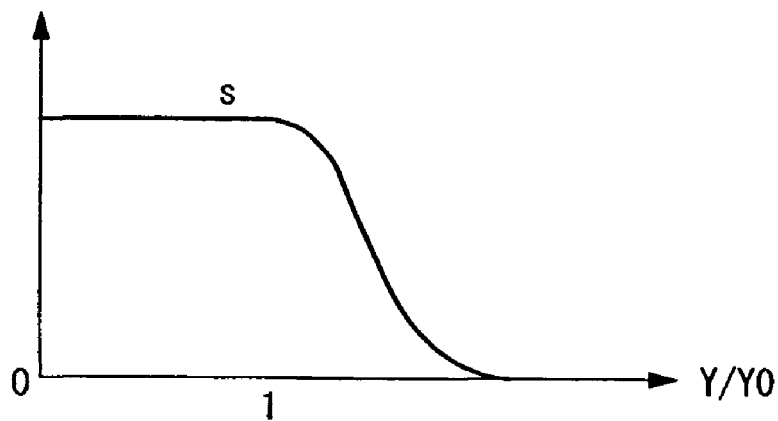
FIG. 24 is a diagram showing an example of a function s.

In Equation (31) above, Y is the luminance value of the pixel to be processed, $Y_0$ is a threshold luminance for determining dark regions, and s( ) is a function shown in FIG. 24, for example.

The table changing unit 801 stores a plurality of types of table data according to the judgment result of the scene judging unit 800 as table data corresponding to color( ) for setting the enhancement coefficients (saturation-enhancement coefficients $K_{IJ}$). In this embodiment, it stores table data corresponding to color 1 (the same as the function color( ) shown in FIG. 3) representing a default function, table data corresponding to color 2 representing a function for skin tone colors, and table data corresponding to color 3 representing a function for dark regions. Then, the plurality of types of prepared table data are freely used to set the enhancement coefficients for determining the level of signal processing using the first correction coefficient, in other words, the final saturation-enhancement coefficients $K_{IJ}$, from the correction coefficients $g1_{IJ}$ and the luminance values Y for the input pixels to be processed. For example, the final saturation-enhancement coefficients $K_{IJ}$ are calculated using Equation (32) below and are output to the saturation enhancement unit 803. The saturation enhancement unit 803 performs the saturation enhancement shown in Equation (4) using the saturation-enhancement coefficients $K_{IJ}$ received from the table changing unit 801.

$$K_{IJ} = D_1 * color2(g1_{IJ} * Y) + (1-D_1) * D_2 * color3(g1_{IJ} * Y) + (1-D_1) * (1-D_2) * color1(g1_{IJ} * Y) \quad (32)$$

Figure 25:
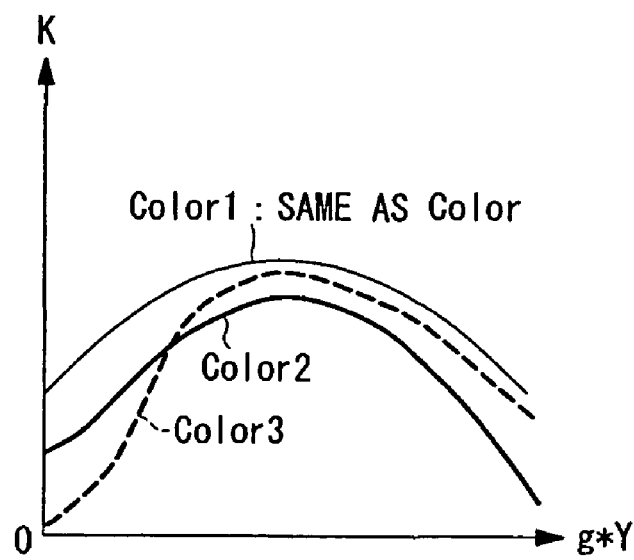
FIG. 25 is a diagram showing examples of a table used in calculating saturation-enhancement coefficients.

As shown in the example in FIG. 25, color2 and color3 have characteristics such that, in skin-tone regions, the saturation of particularly bright regions is reduced without enhancing the saturation much, and in dark regions, the saturation in particular is reduced in particularly low-luminance regions. As shown in the example in Equation (32), in this embodiment, the enhancement coefficients (in this case, the saturation-enhancement coefficients $K_{IJ}$) are set using the plurality of kinds of table data while applying weighting to each item of table data using the degree $D_n$ to which the pixels to be processed belong to a specific subject.

The table changing unit 801 also operates when the enhancement gain $Eg_{IJ}$ is needed in the edge enhancement unit 808. In this case, the edge enhancement unit 808 outputs, to the table changing unit 801, the same first correction coefficients $g1_{IJ}$ and luminance values Y for the pixels to be processed as the saturation enhancement unit 803, and the enhancement gains $Eg_{IJ}$ are calculated in the table changing unit 801 according to the following procedure, instead of Equation (15) above.

Figure 26:
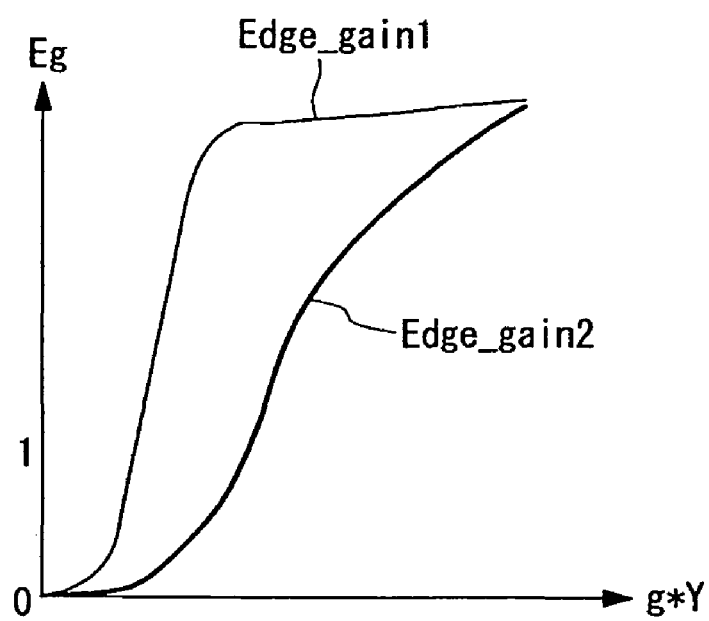
FIG. 26 is a diagram showing examples of a table used in calculating an edge-enhancement gain.

First, the table changing unit 801 obtains the degree $D_2$ to which the pixels to be processed belong to a dark region using the same method as that used to calculate the saturation-enhancement coefficients. As the table data corresponding to edge_gain( ) for setting the enhancement coefficients (enhancement gains $Eg_{IJ}$), the table changing unit 801 saves a plurality of types of table data according to the judgment results of the scene-judging unit 800. In this embodiment, it saves table data corresponding to edge_gain1 representing a default function (the same as the function edge_gain( ) shown in FIG. 7) and table data corresponding to edge_gain2 representing the function for dark regions. FIG. 26 is a diagram showing examples of edge_gain1 and edge_gain2.

Then, the plurality of types of prepared table data are freely used to set the enhancement coefficients for determining the level of signal processing using the first correction coefficients, in other words, the final enhancement gain $Eg_{IJ}$, from the correction coefficients $g1_{IJ}$ and the luminance values Y for the input pixels to be processed. For example, the final enhancement gains $Eg_{IJ}$ are calculated using Equation (33) below and are output to the edge enhancement unit 808. The edge enhancement unit 808 then performs the same processing as the edge enhancement unit 208 (the processing in Equations (16) to (19)) using the edge-enhancement gains $Eg_{IJ}$ received from the table changing unit 801.

$$Eg_{IJ}=D_2*\text{edge\_gain2}(g1_{IJ}*Y)*t(g1_{IJ})+ (1-D_2)*\text{edge\_gain1}(g1_{IJ}*Y) \quad (33)$$

As shown in Equation (33), in this embodiment, the enhancement coefficients (in this case, the enhancement gains $Eg_{IJ}$) are set using the plurality of types of table data while applying a weighting to each item of table data based on the degree $D_n$ to which the pixels to be processed belong to a specific subject.

Figure 27:
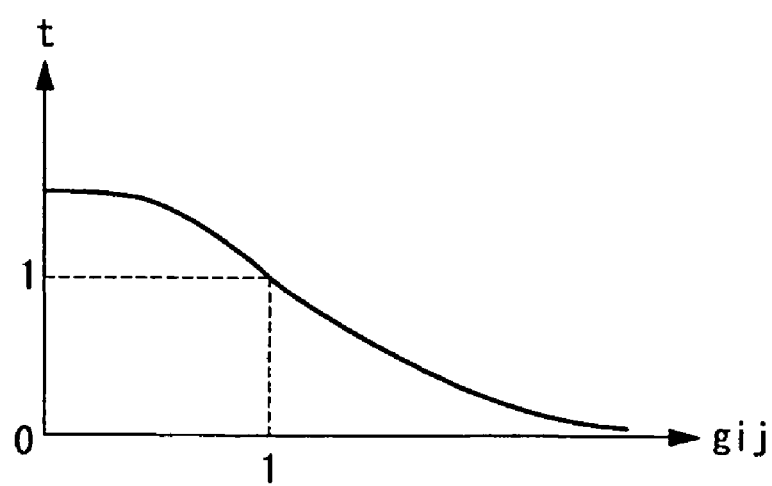
FIG. 27 is a diagram showing an example of a function t.

The table changing unit 801 sets the enhancement coefficients (the enhancement gains $Eg_{IJ}$) so as to reduce the amount of noise. To do so, a function t( ) is used in this embodiment. The function t( ) is a function for reducing the amount of edge enhancement as the correction coefficients increase; for example, it has the characteristic shown in FIG. 27. As a result of this calculation, the edge-enhancement gain decreases as the dark regions and the correction coefficients increase, thus reducing the amount of noise.

Fifth Embodiment

Next, an image-signal processing apparatus according to a fifth embodiment of the present invention will be described below with reference to the drawings.

Figure 28:
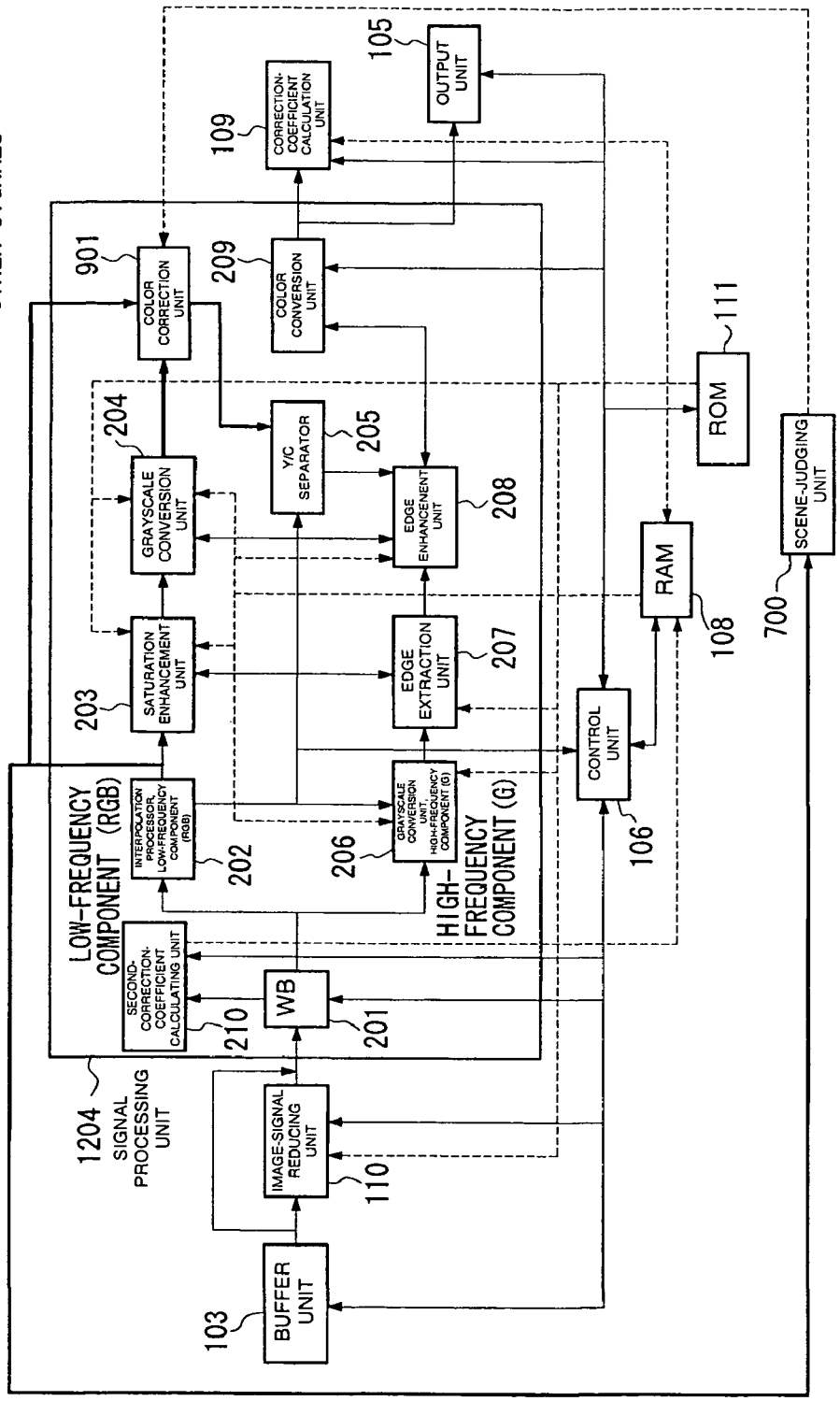
FIG. 28 is a block diagram showing, in outline, the configuration of a signal processing unit of an image-signal processing apparatus according to a fifth embodiment of the present invention, and the vicinity thereof.

The fifth embodiment has substantially the same configuration as that of the image-signal processing apparatus according to the third embodiment described above; it differs, however, in that a color-correction 901 serving as a re-adjustment unit is also provided, as shown in FIG. 28.

For the image-signal processing apparatus according to this embodiment, a description of points common to the third embodiment is omitted, and only the differences will be described.

FIG. 28 is a block diagram showing, in outline, the configuration of the image-signal processing apparatus according to this embodiment.

In the preprocessing in this embodiment, the scene-judging unit 700 performs the operations described in the third embodiment above, calculates indexes $A_1$, $A_2$, and $A_3$ indicating the degree of importance of skin tone colors, green, and sky-blue in the current scene, and transfers the calculation results to the color-correction unit 901.

Then, in the main processing, the processing up to the grayscale conversion unit 204 is the same processing as that performed in the first embodiment described above, and then, the luminance and color difference signals [Y', Cr', Cb'] after processing are output to the color-correction unit 901. The color-correction unit 901 receives the color-interpolated values (R, G, B) from the interpolation processor 202, and obtains the degrees, $D_1$, $D_2$, and $D_3$ to which the pixels to be processed belong to the skin tone colors, green, and sky blue using the same method as the correction-coefficient adjusting unit 701 according to the third embodiment described above.

Next, the color-correction unit 901 obtains the saturation S and hue H of the input signal from the input luminance and color-difference signals and, on the basis thereof, adjusts the final luminance value Y' and saturation S' according to Equation (34) below (where n is an integer from 1 to 3 corresponding to skin tones, green, and blue, in this order).

$$r_n = A_n * D_n$$

$$c1 = r_1*(1-r_2)*(1-r_3)$$

$$c2 = (1-r_1)*r_2*(1-r_3)$$

$$c3 = (1-r_1)*(1-r_2)*r_3$$

$$c4 = 1-c1-c2-c3$$

$$Y' = c1*Y'_1+c2*Y'_2+c3*Y'_3+c4*Y$$

$$S' = c1*S'_1+c2*S'_2+c3*S'_3+c4*S \quad (34)$$

In Equation (34) above, $Y'_1$, $Y'_2$, and $Y'_3$ are the luminances corresponding to skin tone colors, green, and sky blue, after adjusting the input signal. $S'_1$, $S'_2$, and $S'_3$ are the saturations corresponding to skin tone colors, green, and sky blue, after adjusting the input signals. c1 to c4 are weighting coefficients for combining the adjusted results for each color with the unadjusted results.

The final luminances Y' and saturations S' calculated in this way are reconverted to luminance signals and color-difference signals and are output to the Y/C separator 205.

The method of calculating the correction results when the input signal is a specific color is based on a known gamut mapping method. A concrete example of this method is described below using skin tone colors as an example.

Figure 29:
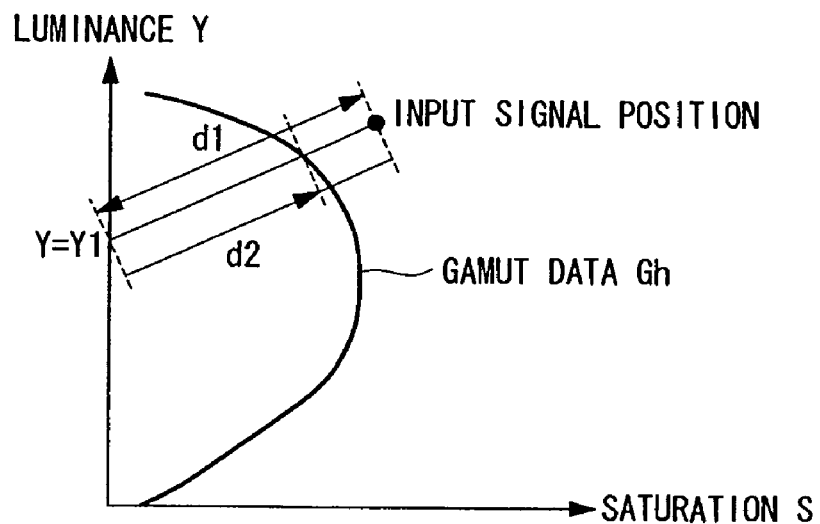
FIG. 29 is a diagram showing an example of a method of correcting the luminance and saturation for a specific color.

The color-correction unit 901 saves gamut data representing combinations of preferred luminances and saturations, related to skin tones, for each hue. This data is the line shown in FIG. 29 in a two-dimensional coordinate plane representing luminance and saturation When defining the gamut data for the hue of the input signal as Gh, the region closer to the luminance axis than Gh is determined as being a desirable color, and a distant region is determined as being an undesirable color. Then, the corrected luminances and saturations are calculated using Equation (35) below so that the input signal is not contained in the undesirable region.

$$Y'_n = (Y-Y_1)*(\alpha(d1,d2)/d1)+Y1$$

$$S'_n = (\alpha(d1,d2)/d1)*S \quad (35)$$

Figure 30:
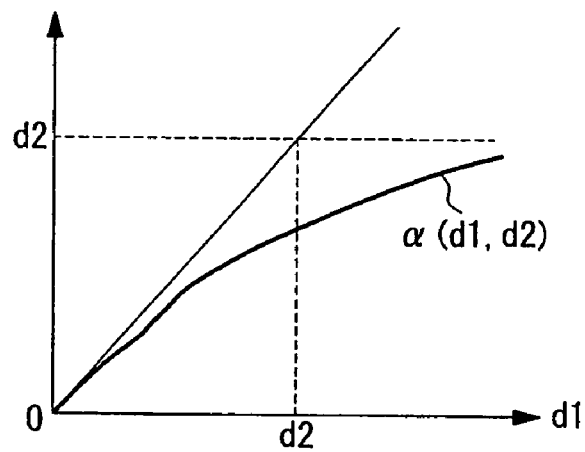
FIG. 30 is a diagram showing an example correction function for performing correction for the specific color.

Here, α( ) is the function shown in FIG. 30; d1 is a distance from a specific point on the luminance axis (luminance $Y_1$) to the input signal having coordinates luminance Y and saturation S (Y,S); d2 is a distance to an intersection of a line joining the specific point on the luminance axis (luminance $Y_1$) and the input signal, and the line of the gamut data Gh. As a result of this calculation, because a does not exceed d2 even if d1 becomes larger than d2, the distance between the corrected point ($Y'_1$, $S'_1$) and the specific point on the luminance axis is always d2 or less, and therefore, the corrected point is always contained in a region closer to the luminance axis than the gamut data Gh.

With the image-signal processing apparatus according to this embodiment, after correcting the luminance and saturation of the input signal so that they are not undesirable for each color, that is, skin tone colors, green, and sky-blue, the degree to which the pixels to be processed belong to each color and the importance of each color in the scene are considered and weighted. Therefore, as a result, the optimum color reproduction for the scene is achieved.

Sixth Embodiment

Next, an image-signal processing apparatus according to a sixth embodiment of the present invention will be described with reference to the drawings.

The sixth embodiment is basically the same as the first and second embodiments; however, in the first embodiment, the second correction coefficients $g2_{ij}$ related to the space-variant grayscale conversion are calculated in the preprocessing, and the first correction coefficients are calculated on the basis of these second correction coefficients $g2_{ij}$. Also, in the second embodiment, the second correction coefficients $K_L$ related to the space-variant saturation enhancement are calculated in the preprocessing, and the first correction coefficients are calculated on the basis of these second correction coefficients $K_L$. In contrast, in this sixth embodiment, second correction coefficients $F1_{IJ}$ related to space-variant edge enhancement are calculated in preprocessing, and the first correction coefficients $g1_{IJ}$ are calculated on the basis of these edge-enhancement-related second correction coefficients $F1_{IJ}$.

For the image-signal processing apparatus according to this embodiment, a description of features common to the first and second embodiments will be omitted, and only the differences will be described. Components that are the same as those in the first and second embodiments described above are assigned the same reference numerals, and a detailed description thereof will be omitted.

Figure 31:
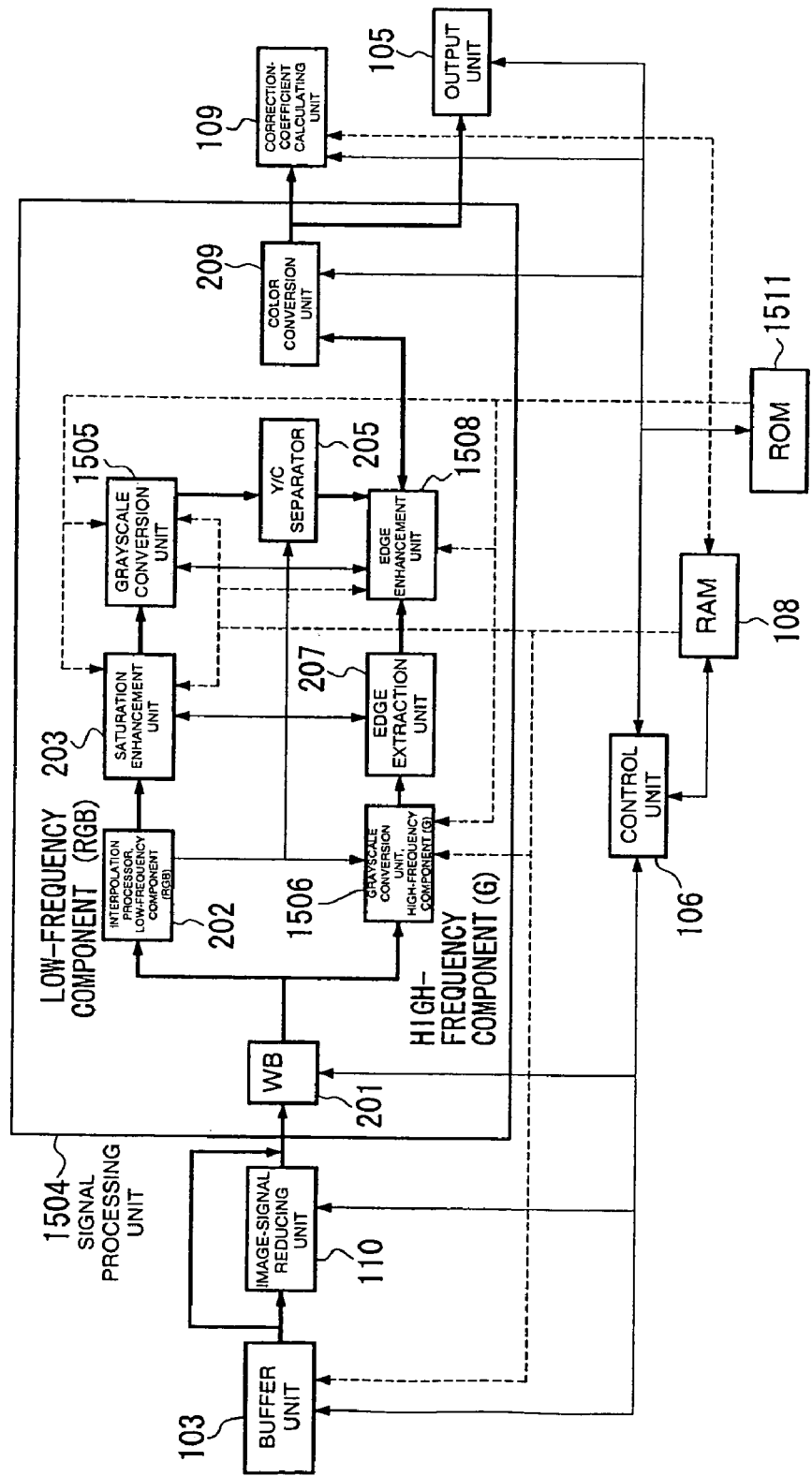
FIG. 31 is a block diagram showing an example configuration of a signal processing unit according to a sixth embodiment of the present invention.

FIG. 31 is a block diagram showing an example configuration of a signal processing unit 1504 according to this embodiment. As shown in this figure, the signal processing unit 1504 has substantially the same configuration as the signal processing unit 504 according to the second embodiment, shown in FIG. 13. However, it differs in the following aspects: instead of the saturation enhancement unit 603, it includes the saturation enhancement unit 203, like the first embodiment; instead of the grayscale conversion unit 604, it includes a gray-scale conversion unit 1505; instead of the grayscale conversion unit 206, it includes a grayscale conversion unit 1506; and instead of the ROM 111, it includes a ROM 1511. A specific region related to edge enhancement and second correction coefficients $F1_{IJ}$ for edge enhancement, which are related to that specific region, are stored in advance in the ROM 1511.

In the signal processing unit 1504 according to this embodiment, first, in preprocessing, the WB unit 201 performs known white balance correction on the transferred image signal on the basis of a control signal from the control unit 106. The image signal after white balance correction is then transferred to the interpolation processor 202 and the grayscale conversion unit 1506. The interpolation processor 202 generates three images from the single image by using known interpolation processing and transfers them to the saturation enhancement unit 203.

Because the saturation enhancement unit 203 performs the same saturation enhancement as in the first embodiment (see Equations (1) to (8)), it is assigned the same reference numeral, and a detailed description thereof is omitted.

The image signal subjected to saturation enhancement by the saturation enhancement unit 203 is transferred to the grayscale conversion unit 1505 under the control of the control unit 106.

The grayscale conversion unit 1505 performs grayscale conversion on the basis of a γ-characteristic. In this embodiment, as shown in FIG. 5, 12-bit RGB data is converted to 10 bits. The processing performed by the grayscale conversion unit 1505 will be described in detail below.

In preprocessing, the grayscale conversion unit 1505 first reads out a fixed correction coefficient $S_0$ from the ROM 1511, and then performs grayscale conversion by multiplying the converted 10-bit RGB data by the fixed correction coefficient $S_0$ corresponding to each pixel or each region, as shown in Equation (36) below.

$$Z_0 = Q_0 * S_0 \quad (36)$$

In Equation (36) above, $Q_0$ is the converted 10-bit RGB pixel values ($R_0$, $G_0$, $B_0$), and $Z_0$ is the RGB pixel values after grayscale conversion ($R_0$, $G_0$, $B_0$).

In the main processing on the other hand, the grayscale conversion unit 1505 first reads out the first correction coefficients $g1_{ij}$ from the RAM 108. Because the first correction coefficients $g1_{ij}$ that are read out are calculated for the reduced image signal, interpolated first correction coefficients $g1_{IJ}$ corresponding to the original image signal are obtained by performing interpolation on the correction coefficients corresponding to the missing pixels or regions so as to be associated with each pixel or each region of the original image signal. Then, grayscale conversion is performed by multiplying the 10-bit RGB data after the conversion described above by the first correction coefficients $g1_{IJ}$ corresponding to the original image signal, as shown in Equation (37) below. If the multiplied pixel value exceeds the upper limit of the 10 bits, the grayscale conversion unit 1505 sets it to the upper limit.

$$Z_{IJ} = Q_{IJ} * g1_{IJ} \quad (37)$$

In Equation (37) above, $Q_{IJ}$ is the converted 10-bit pixel value ($R_{IJ}$, $G_{IJ}$, $B_{IJ}$) of each pixel or each region, and $Z_{IJ}$ is the pixel value ($R_{IJ}$, $G_{IJ}$, $B_{IJ}$) of each pixel or each region after grayscale conversion.

The image signal after grayscale conversion is transferred to the Y/C separator 205 under the control of the control unit 106. The Y/C separator 205 performs known Y/C separation under the control of the control unit 106. The separated luminance signal Y_low and color difference signal CrCb are transferred to the edge enhancement unit 1508.

In the preprocessing, the grayscale conversion unit 1506 extracts only the G signal from the single image transferred from the WB unit 201 and converts 12-data to 10 bits. Next, it reads out the fixed correction coefficient $S_0$ from the ROM 1511 and performs grayscale conversion by multiplying the G signal data by this fixed correction coefficient $S_0$ at each pixel or each region. In the main processing on the other hand, it reads out the first correction coefficients $g1_{ij}$ from the RAM 108 and obtains the first correction coefficients $g1_{IJ}$ corresponding to the original image signal by performing interpolation on these first correction coefficients $g1_{ij}$. Then, it performs grayscale conversion by multiplying the G signal data by the interpolated first correction coefficients $g1_{IJ}$ at each pixel or each region.

The processed signal is then transferred to the edge extraction unit 207.

The edge extraction unit 207 extracts the edge intensity E by performing known edge extraction under the control of the control unit 106 and transfers it to the edge enhancement unit 1508.

In the preprocessing, the edge intensity E from the edge enhancement unit 207 and the luminance signal Y_low from the Y/C separator 205 are transferred to the edge enhancement unit 1508 under the control of the control unit 106. The edge-intensity control unit 301 reads out a specific region and second correction coefficient value f0 related to that specific region, which are stored in the ROM 1511. Next, the applicable region of the image signal is set on the basis of the specific region which is read out. For example, if the specific region is M pixels×N pixels, an M pixel×N pixel image signal box is set as the specific region, with the focus center point during image acquisition defining the center of the applicable region. Then, second correction coefficient values g0 for the pixels outside the specific region are read out from the ROM 1151, and the second correction coefficient values $F1_{ij}$ for each pixel in the image, obtained from the second correction coefficient values F0, outside the specific region and inside the specific region are respectively set to $F1_{ij}=g0$ (pixel positions outside the specific region) and $F1_{ij}=f0$ (pixel positions inside the specific region).

At the preprocessing stage, because the reduced image signal is processed, the same reduction ratio is also applied to the specific region. In other words, the M pixel×N pixel specific region is reduced on the basis of the same reduction ratio. In addition, an edge-enhancement gain $Eg_0$ is calculated using the luminance signal Y_low and the read out second correction coefficients $F1_{ij}$ inside the reduced specific region, according to Equation (38) below, and this gain $Eg_{ij}$ is transferred to the coring control unit 302.

$$Eg_{ij}=\text{Edge\_gain}(Y\_low*F1_{ij}) \quad (38)$$

Edge_gain( ) is a predetermined function defining the relationship between $Eg_{ij}$ and $Y\_low*F1_{ij}$ (see FIG. 7).

In the main processing, the edge intensity E from the edge extraction unit 207 and the luminance signal Y_low from the Y/C separator 205 are transferred to the edge enhancement unit 1508 under the control of the control unit 106. The edge-intensity control unit 301 reads out a specific region and second correction coefficients $F1_{IJ}$ for edge enhancement, related to that specific region, which are stored in the ROM 1511. Next, an applicable region of the image signal is set on the basis of the specific region which is read out. Then, edge-enhancement gains $Eg_{IJ}$ are calculated using the luminance signal Y_low and the second correction-coefficients $F1_{IJ}$ inside the specific region, according to Equation (39) below, and these gains $Eg_{IJ}$ are transferred to the coring control unit 302.

$$Eg_{IJ}=\text{Edge\_gain}(Y\_low*F1_{IJ}) \quad (39)$$

The coring processing and chroma suppression are the same as in the embodiments described above, and a description thereof is thus omitted.

What is claimed is:

1. An image-signal processing apparatus for performing image signal processing on an input image signal, the image-signal processing apparatus comprising:
   a first signal processing unit for performing first signal processing on the input image signal;
   a correction-coefficient calculating unit for calculating a first correction coefficient on the basis of the input image signal subjected to the first signal processing by the first signal processing unit; and
   a second signal processing unit for performing second signal processing on the input image signal using the first correction coefficient;
   wherein the correction-coefficient calculating unit extracts a pixel or a region of prescribed size from the image signal generated by the first signal processing unit and calculates the first correction coefficient for the extracted pixel or region.

2. An image-signal processing apparatus for performing image signal processing on an input image signal, the image-signal processing apparatus comprising:
   a first signal processing unit for performing first signal processing on the input image signal;
   a correction-coefficient calculating unit for calculating a first correction coefficient on the basis of the input image signal subjected to the first signal processing by the first signal processing unit; and
   a second signal processing unit for performing second signal processing on the input image signal using the first correction coefficient;
   wherein the first signal processing unit extracts a pixel or a region of prescribed size from the image signal to be processed, calculates a second correction coefficient for the extracted pixel or region, and performs the first signal processing using the second correction coefficient.

3. An image-signal processing apparatus according to claim 2, wherein the first signal processing unit includes at least one of a saturation enhancement unit for performing saturation-enhancement using the second correction coefficient; an edge enhancement unit for performing edge enhancement using the second correction coefficient; and a grayscale conversion unit for performing grayscale conversion using the second correction coefficient.

4. An image-signal processing apparatus according to claim 3, wherein the edge enhancement unit includes
   an edge extraction unit for extracting an edge intensity from an image signal to be processed;
   a first control unit for controlling an enhancement gain for the edge intensity;
   a second control unit for controlling a coring gain for the edge intensity; and
   a third control unit for controlling a chroma-suppression gain for the edge intensity.

5. An image-signal processing apparatus according to claim 4, wherein the first control unit includes
   an enhancement-gain calculating unit for calculating an enhancement gain for the edge intensity; and
   an enhancement-gain correction unit for correcting the enhancement gain on the basis of the first correction coefficient.

6. An image-signal processing apparatus according to claim 5, wherein the second control unit includes
   an coring-gain calculating unit for calculating the coring gain on the basis of the edge intensity; and
   a coring-gain correction unit for correcting the coring gain on the basis of the corrected enhancement gain.

7. An image-signal processing apparatus according to claim 6, wherein the third control unit includes
- a chroma-suppression-gain calculating unit for calculating the chroma-suppression gain on the basis of the edge intensity; and
- a chroma-suppression-gain correction unit for correcting the chroma-suppression gain on the basis of the corrected coring gain.

8. An image-signal processing apparatus according to claim 3, wherein the saturation enhancement unit includes a color-signal conversion unit for performing matrix transformation in RGB signal space.

9. An image-signal processing apparatus according to claim 3, wherein the saturation enhancement unit includes a color-signal conversion unit for performing table conversion in RGB signal space.

10. An image-signal processing apparatus according to claim 3, wherein the saturation enhancement unit includes a color-signal conversion unit for performing matrix transformation in L*a*b* signal space.

11. An image-signal processing apparatus according to claim 3, wherein the saturation enhancement unit includes a color-signal conversion unit for performing table conversion in L*a*b* signal space.

12. An image-signal processing apparatus according to claim 11, further comprising:
- a scene-judging unit for judging whether or not the input image signal is an image signal obtained by acquiring a prescribed scene or a prescribed subject,
- wherein at least one of the first signal processing unit and the second signal processing unit changes the processing on the basis of the judgment result of the scene-judging unit.

13. An image-signal processing apparatus according to claim 12, further comprising a correction coefficient adjusting unit for adjusting at least one of the first correction coefficient and the second correction coefficient on the basis of the judgment result of the scene-judging unit.

14. An image-signal processing apparatus according to claim 13, wherein the correction-coefficient adjusting unit performs adjustment so that at least one of the first correction coefficient and the second correction coefficient is limited to a prescribed range.

15. An image-signal processing apparatus according to claim 13, wherein the correction-coefficient adjusting unit adjusts a spatial frequency of at least one of the first correction coefficient and the second correction coefficient.

16. An image-signal processing apparatus according to claim 12, wherein the scene-judging unit judges whether or not the input image signal is an image signal obtained by acquiring the prescribed scene or the prescribed subject, conditioned on whether the input image signal is contained in a prescribed region in a color space.

17. An image-signal processing apparatus according to claim 12, further comprising
- an enhancement-coefficient setting unit for setting an enhancement coefficient for determining a level of signal processing with the first correction coefficient,
- wherein the enhancement-coefficient setting unit sets the enhancement coefficient on the basis of the judgment result of the scene-judging unit.

18. An image-signal processing apparatus according to claim 17, wherein
- the scene-judging unit judges whether or not the input image signal is an image signal obtained by acquiring the prescribed scene or the prescribed subject, conditioned on whether the luminance of the input image signal is a prescribed threshold or less, and
- the enhancement-coefficient setting unit sets the enhancement coefficient so that the level of signal processing becomes less when the condition is met.

19. An image-signal processing apparatus according to claim 12, further comprising a re-adjustment unit for further adjusting the image signal after signal processing is performed using at least one of the first correction coefficient and the second correction coefficient, on the basis of the judgment result of the scene-judging unit.

20. An image-signal processing apparatus according to claim 12, wherein the scene-judging unit judges whether or not the input image signal is an image signal obtained by acquiring the prescribed scene or the prescribed subject according to the number of pixels in the input image signal that satisfy a prescribed condition.

21. An image-signal processing apparatus according to claim 1, wherein the first signal processing unit includes at least one of
- a saturation enhancement unit for performing saturation enhancement using a fixed correction coefficient, an edge enhancement unit for performing edge enhancement using the fixed correction coefficient, and a grayscale conversion unit for performing grayscale conversion using the fixed correction coefficient.

22. An image-signal processing apparatus according to claim 1, wherein the second signal processing unit includes at least one of a saturation enhancement unit for performing saturation enhancement using the first correction coefficient, an edge enhancement unit for performing edge enhancement using the first correction coefficient, and a grayscale conversion unit for performing grayscale conversion using the first correction coefficient.

23. An image-signal processing apparatus for performing image-signal processing on an input image signal, the image signal processing apparatus comprising:
- a reduction unit for performing reduction processing on the input image signal to generate a reduced image signal;
- a first signal processing unit for performing first signal processing on the reduced image signal;
- a correction-coefficient calculating unit for calculating a first correction coefficient on the basis of the input image signal subjected to the first signal processing by the first signal processing unit; and
- a second signal processing unit for performing second signal processing on the input image signal using the first correction coefficient;
- wherein the correction-coefficient calculating unit includes a coefficient-interpolating unit which obtains the first correction coefficient corresponding to the reduced image signal from the image signal after the first signal processing performed on the reduced image signal and calculates the first correction coefficient for the input image signal by performing interpolation on the first correction coefficient corresponding to the reduced image signal.

24. An image-signal processing apparatus according to claim 23, further comprising a reduction-ratio setting unit for setting a reduction ratio.

25. An image-signal processing apparatus according to claim 23, wherein the second signal processing unit includes at least one of a saturation enhancement unit for performing saturation enhancement using the first correction coefficient, an edge enhancement unit for performing edge enhancement using the first correction coefficient, and a grayscale conversion unit for performing grayscale conversion using the first correction coefficient.

26. A non-transitory computer-readable medium storing an image-signal processing program for performing image-signal processing on an input image signal the image-signal processing program causing a computer to execute:
- a step of performing first signal processing on the input image signal;
- a step of calculating a first correction coefficient on the basis of the input image signal after performing the first signal processing; and
- a step of performing second signal processing on the input image signal using the first correction coefficient;
- wherein the correction-coefficient calculating unit extracts a pixel or a region of prescribed size from the image signal generated by the first signal processing unit and calculates the first correction coefficient for the extracted pixel or region.

27. The non-transitory computer-readable medium storing an image-signal processing program according to claim 26, the image-signal processing program causing a computer to further execute:
- a step of setting a condition for judging whether or not the input image signal is obtained by acquiring a prescribed scene or a prescribed subject,
- wherein the type of processing performed in at least one of the first signal processing and the second signal processing is changed on the basis of whether or not the input image signal from the image-acquisition device meets the condition.

28. A non-transitory computer-readable medium storing an image-signal processing program for performing image-signal processing on an input image signal, the image-signal processing program causing a computer to execute:
- a step of performing reduction processing on the input image signal to generate a reduced image signal;
- a step of performing first signal processing on the reduced image signal;
- a step of calculating a first correction coefficient on the basis of the input image signal after performing the first signal processing; and
- a step of performing second signal processing on the input image signal using the first correction coefficient;
- wherein the correction-coefficient calculating unit includes a coefficient-interpolating unit which obtains the first correction coefficient corresponding to the reduced image signal from the image signal after the first signal processing performed on the reduced image signal and calculates the first correction coefficient for the input image signal by performing interpolation on the first correction coefficient corresponding to the reduced image signal.

* * * * *